United States Patent
Fordyce, III et al.

(10) Patent No.: US 10,325,268 B2
(45) Date of Patent: Jun. 18, 2019

(54) PRODUCT RECALL PLATFORM APPARATUSES, METHODS AND SYSTEMS

(71) Applicant: VISA U.S.A. INC., San Francisco, CA (US)

(72) Inventors: Edward W. Fordyce, III, Sedalia, CO (US); Nurtekin Savas, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 15/839,801

(22) Filed: Dec. 12, 2017

(65) Prior Publication Data

US 2018/0165690 A1    Jun. 14, 2018

Related U.S. Application Data

(60) Division of application No. 14/066,680, filed on Oct. 29, 2013, now Pat. No. 9,846,880, which is a
(Continued)

(51) Int. Cl.
  G06Q 30/00    (2012.01)
  G06Q 10/10    (2012.01)
  G06Q 30/06    (2012.01)

(52) U.S. Cl.
  CPC .......... G06Q 30/014 (2013.01); G06Q 10/10 (2013.01); G06Q 30/0601 (2013.01)

(58) Field of Classification Search
  CPC .................................................. G06Q 30/014
(Continued)

(56) References Cited

U.S. PATENT DOCUMENTS 7,853,481 B1 *  12/2010  Johnson ................ G06Q 10/08
                                              705/26.42
2001/0056359 A1 * 12/2001 Abreu ................ G06K 7/10861
                                                 705/3
(Continued)

FOREIGN PATENT DOCUMENTS

KR    2001-0008333    2/2001
KR    2004-0072590    8/2004

OTHER PUBLICATIONS

International Search Report dated Aug. 5, 2011 for International Application PCT/US2011/035268. (3 pages).
(Continued)

*Primary Examiner* — Mila Airapetian
(74) *Attorney, Agent, or Firm* — Loeb & Loeb, LLP

(57) ABSTRACT

A platform transforms recall initiation request, product identifier and purchase processing request inputs into recall notification message outputs. The Platform receives a purchase processing request including a plurality of product identifiers and preselects product identifiers that qualify for purchase processing based on at least one purchase processing rule. The Platform facilitates querying of a product recall database to determine if the preselected product identifiers match recalled product identifiers in the product recall database. If at least one of the preselected product identifiers match the recalled product identifiers, the Platform retrieves a recall message associated with the at least one of the preselected product identifiers and notification preferences associated with the purchase processing request. The Platform then generates a recall notification message in accordance with the notification preferences to include the recall message associated with the at least one of the preselected product identifiers.

20 Claims, 27 Drawing Sheets

Consumer Product Recall

Related U.S. Application Data continuation of application No. 13/101,083, filed on May 4, 2011, now Pat. No. 8,600,827, and a continuation-in-part of application No. 12/770,607, filed on Apr. 29, 2010, now abandoned.

(60) Provisional application No. 61/331,331, filed on May 4, 2010, provisional application No. 61/293,359, filed on Jan. 8, 2010, provisional application No. 61/174,402, filed on Apr. 30, 2009.

(58) Field of Classification Search
USPC .......................................................... 705/303
See application file for complete search history.

(56) References Cited

U.S. PATENT DOCUMENTS

| | | |
|---|---|---|
| 2002/0040325 A1 | 4/2002 | Takae et al. |
| 2004/0103037 A1 | 5/2004 | Wetmore et al. |
| 2004/0267608 A1 | 12/2004 | Mansfield |
| 2006/0054682 A1* | 3/2006 | de la Huerga ......... G16H 40/20 235/375 |
| 2007/0239502 A1 | 10/2007 | Babu |
| 2009/0065568 A1* | 3/2009 | Grant ................... G06Q 10/087 235/375 |
| 2009/0137225 A1 | 5/2009 | Costanzo |
| 2009/0144104 A1 | 6/2009 | Johnson |
| 2009/0210347 A1 | 8/2009 | Scarcanin |
| 2009/0254535 A1* | 10/2009 | Eickelmann ...... G06F 17/30864 |
| 2011/0040650 A1 | 2/2011 | Johnson |

OTHER PUBLICATIONS

International Search Report dated Dec. 29, 2010 for International Application PCT/US2010/033229.
U.S. consumer Product Safety Commission Office of Compliance Recalls and Compliance Division, Regulated Products Handbook, Jan. 2005, 3rd Edition.
International Preliminary Search Report, dated Oct. 30, 2012.
International Search Report, dated Aug. 5, 2011.
Written Opinion, dated Aug. 5, 2011.
International Search Report, dated Dec. 29, 2010.
Written Opinion, dated Dec. 29, 2010.
International Preliminary Search Report, dated Nov. 1, 2011.

\* cited by examiner

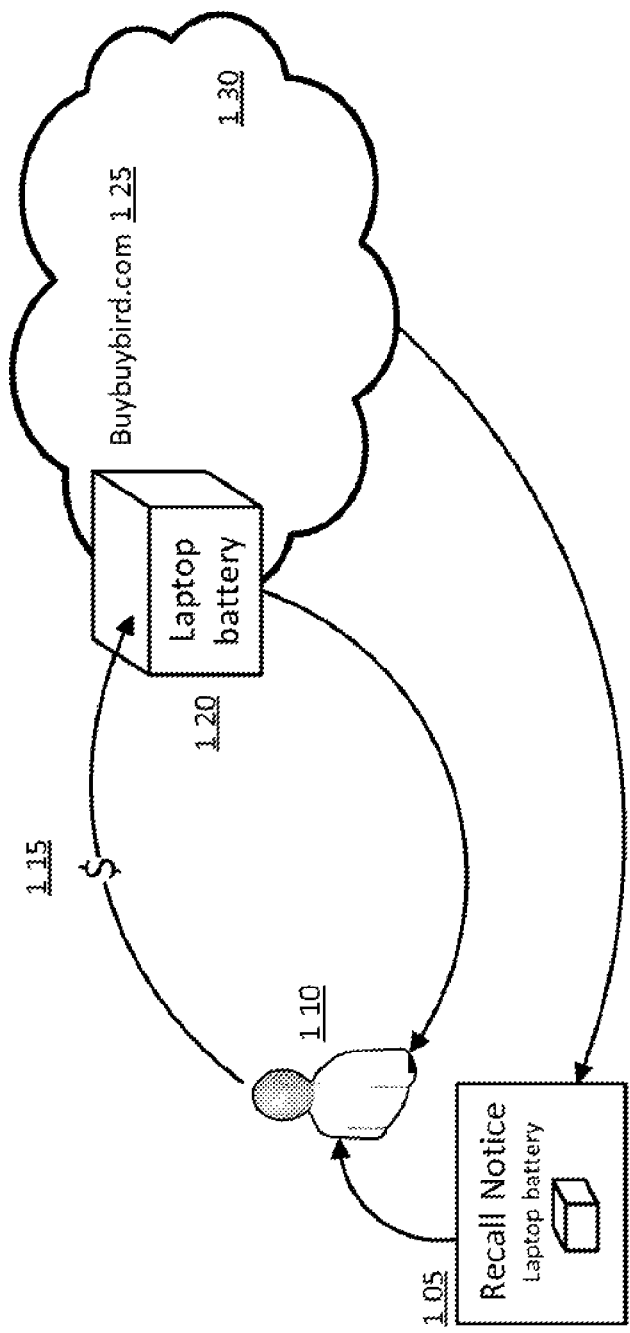
FIG. 1 Consumer Product Recall

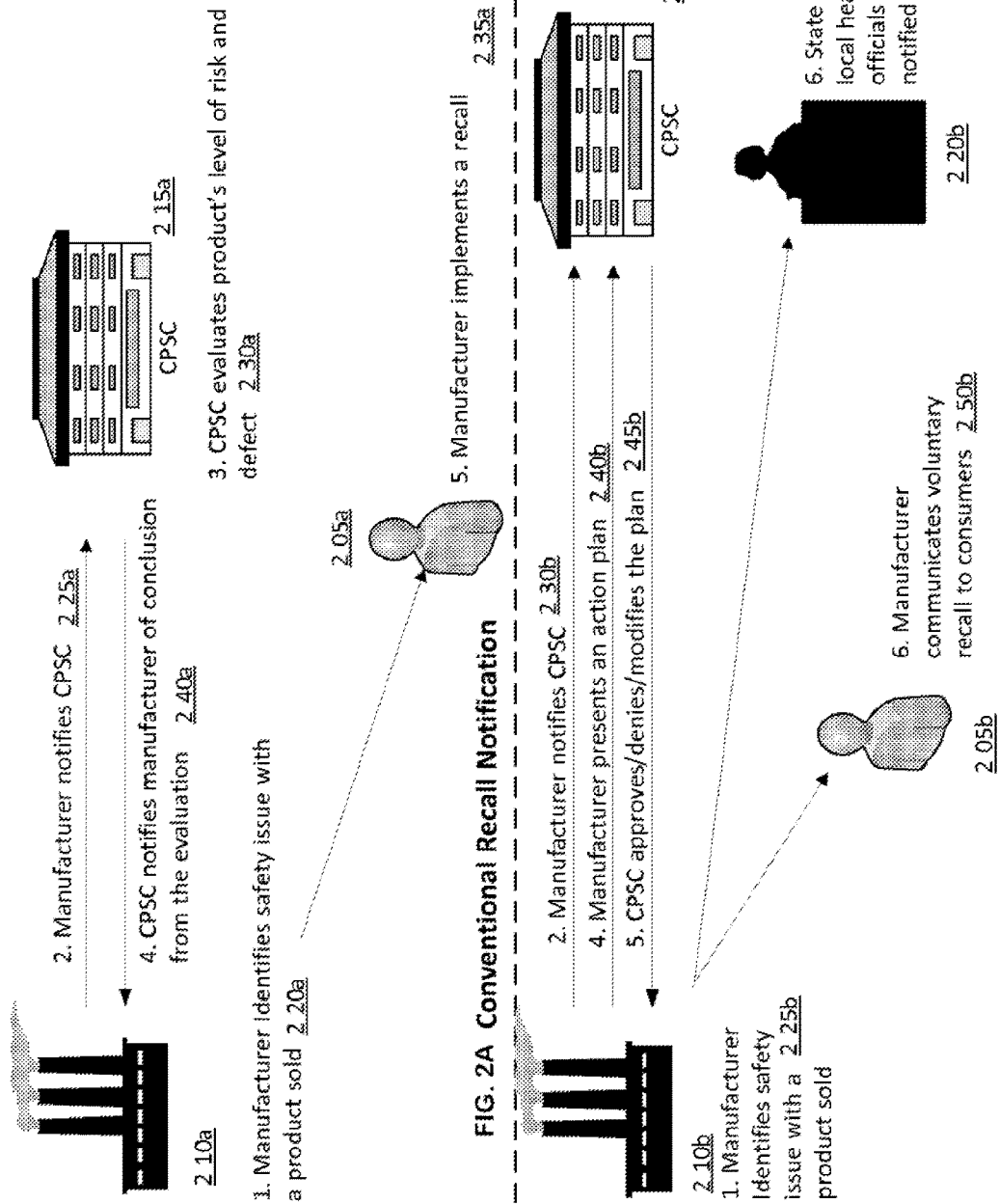

**Children's
(All Kid & Baby Items)**
Apparel, Shoes & Accessories
Books & Bookmarks
Feeding & Soothing
Furniture & Bedroom
Accessories
Gear (Strollers, Carriers, etc.)
Physical Play, Riding & Bikes
Toys & Games (including Educational)

Computers & Electronics
Battery & Power Supplies
Camera & Photo
Computers, Network & Accessories
Navigation Systems
Telephone / Cell Phone
TV, Audio & Video

Sports, Outdoors & Recreation
Camping, Hiking, Fishing & Hunting
Fitness & Exercise
Outdoor Games & Equipment
Sporting Goods & Equipment
Swimming Pool & Spa

Vehicles, Tractors & Motorsports (vehicles that not driven on highways or public access roads and waterways)
General Automotive
Golf Carts & Utility Vehicles
Motorsports & Riding
Personal Transport
Riding Mowers & Yard Tractors

Hardware, Tools & Building Supply
Air Compressors & Pumps
Electrical
Engines/Motors
Hardware & Paint
Heating & Cooling
Ladders & Stairs
Other Hardware, Tools & Building
Plumbing
Power & Hand Tools
Propane & Gas
Roof & Skylight
Sealers
Windows & Doors

Home & Garden
Appliances
Art & Décor
Bed & Bath
Cleaning & Laundry
Fireplaces & Accessories
Flooring & Rugs
Furniture
Kitchen & Dining
Lighters & Matches
Lighting
Outdoor Cooking, Furniture & Décor
Pest Control
Safety & Security
Window
Yard/Property Maintenance

Other
Books
Clothing & Accessories
Collectibles, not elsewhere classified (n.e.c.)
Food & Supplements
Guns & Accessories
Health & Beauty
Hobby
Industrial, Business & Scientific
Musical Instruments
Pet Supplies
Stationery & Office Supply

Figure 3

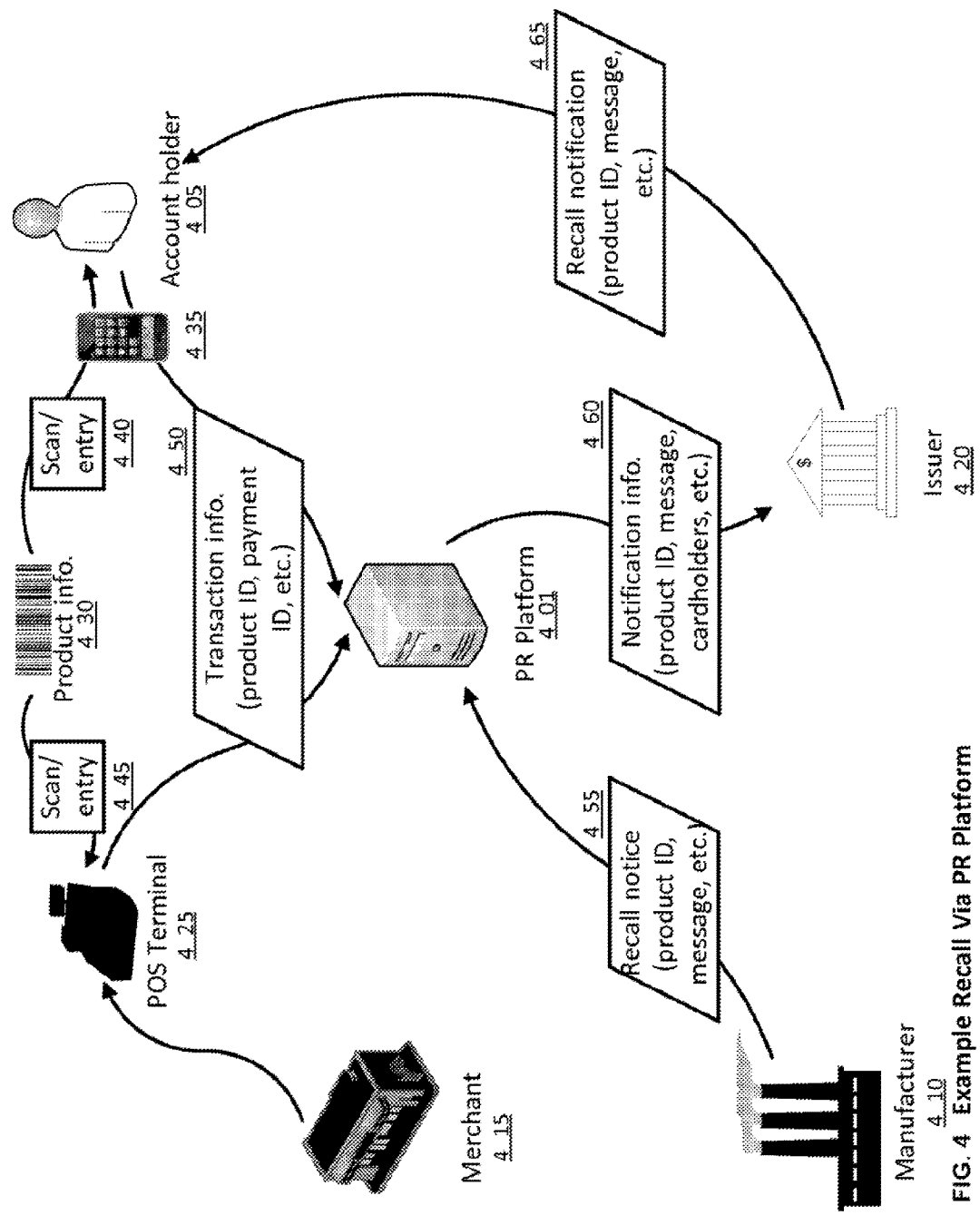
FIG. 4 Example Recall Via PR Platform

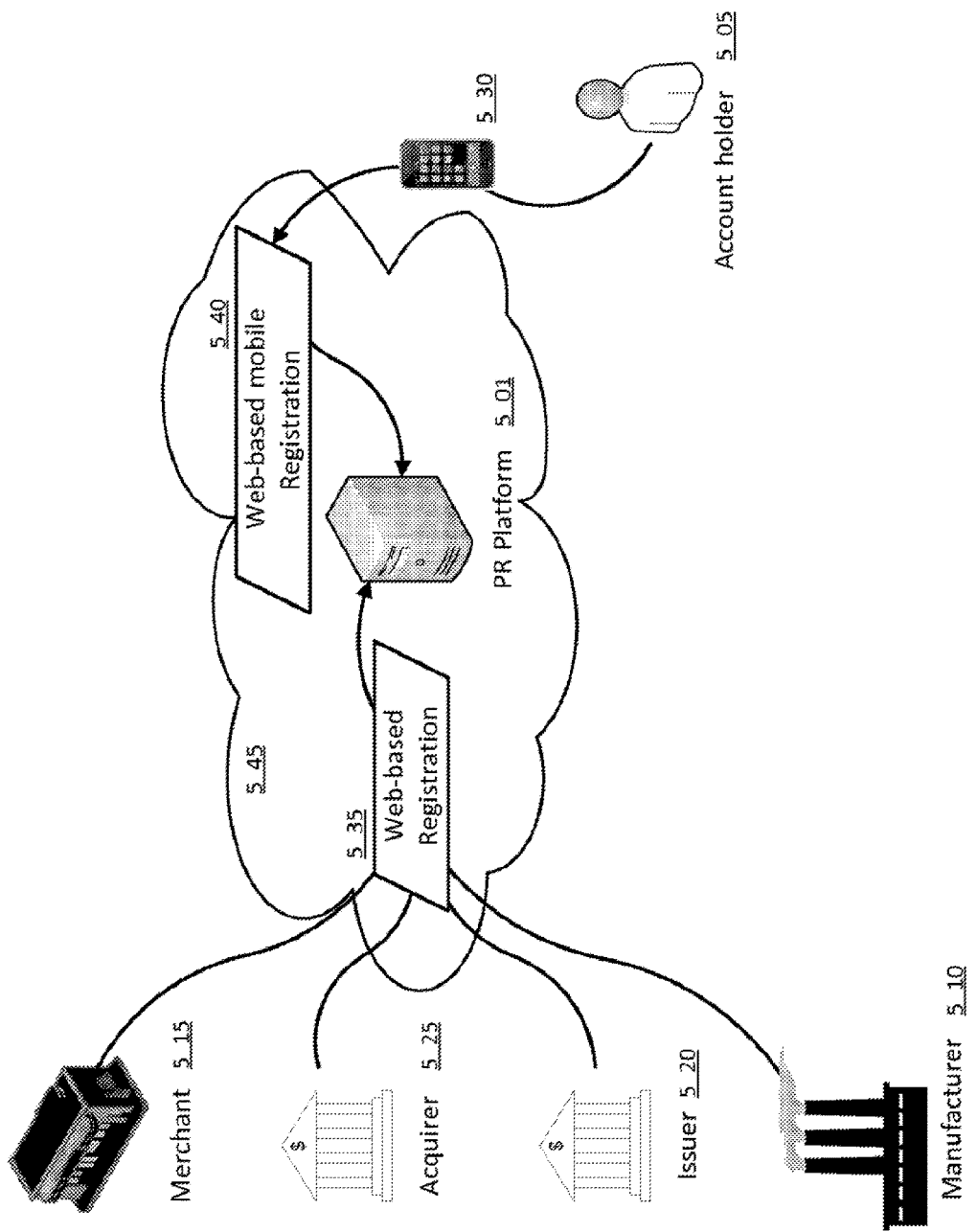
FIG. 5 Example Recall Party Enrollment

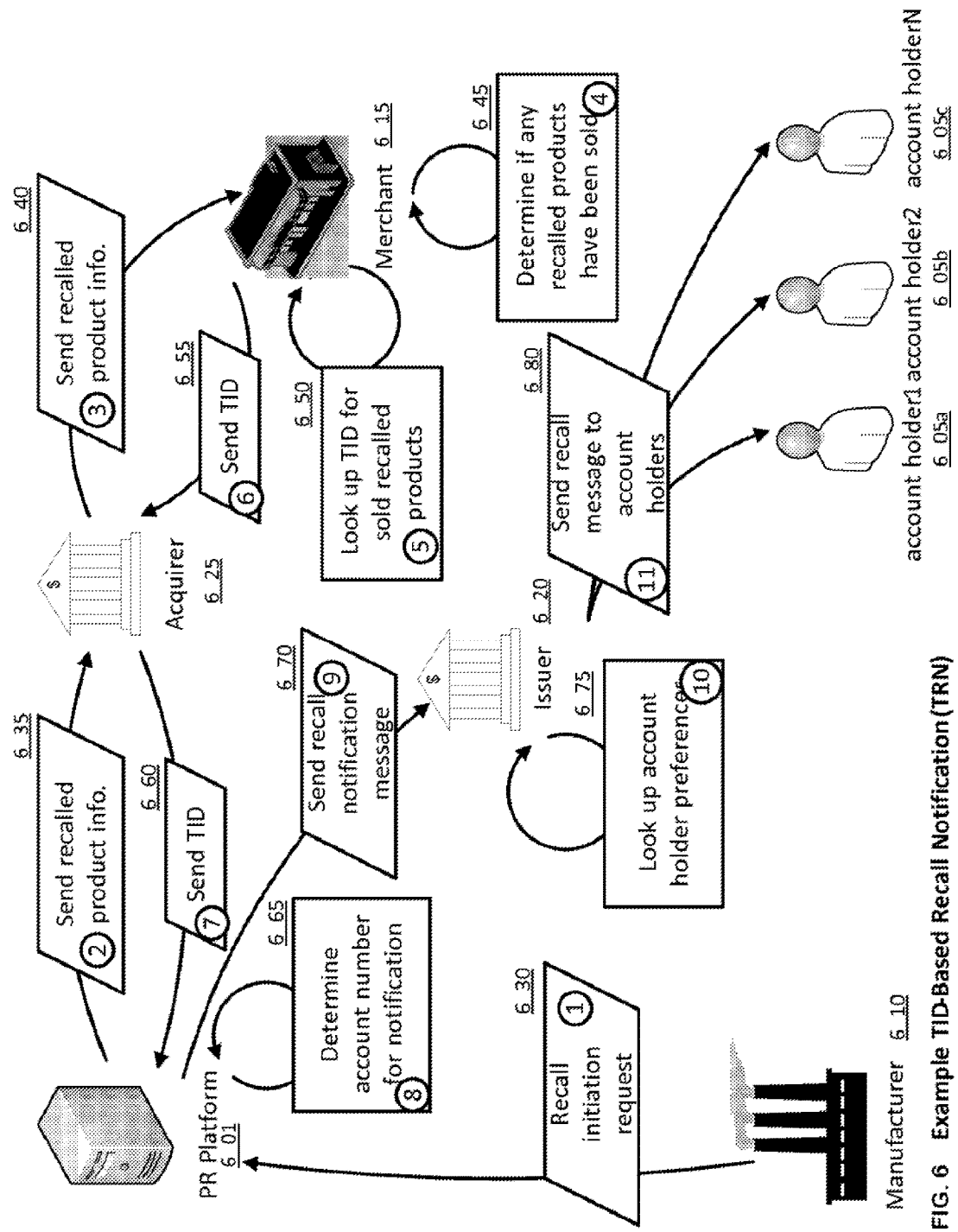
FIG. 6 Example TID-Based Recall Notification (TRN)

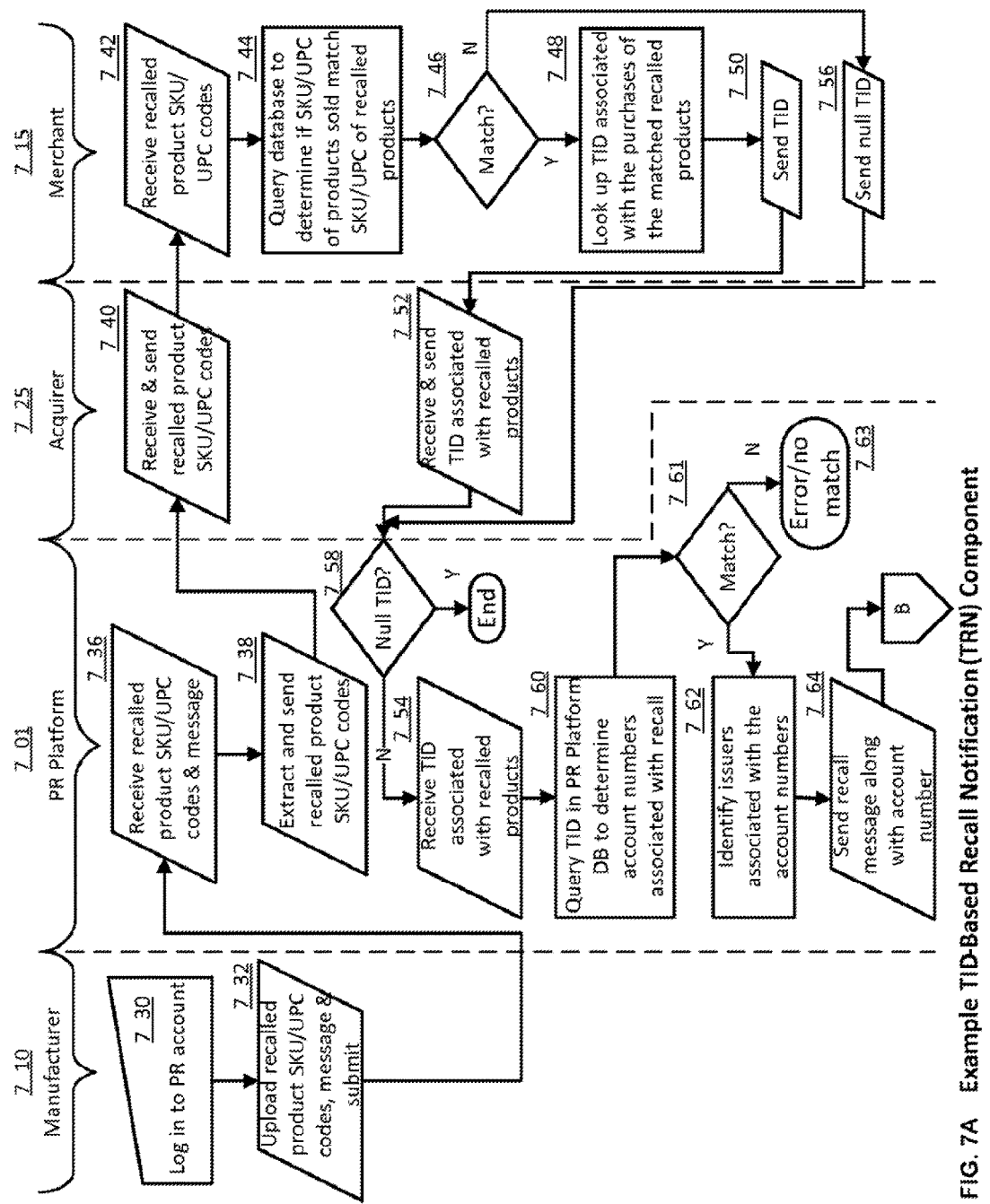
FIG. 7A Example TID-Based Recall Notification (TRN) Component

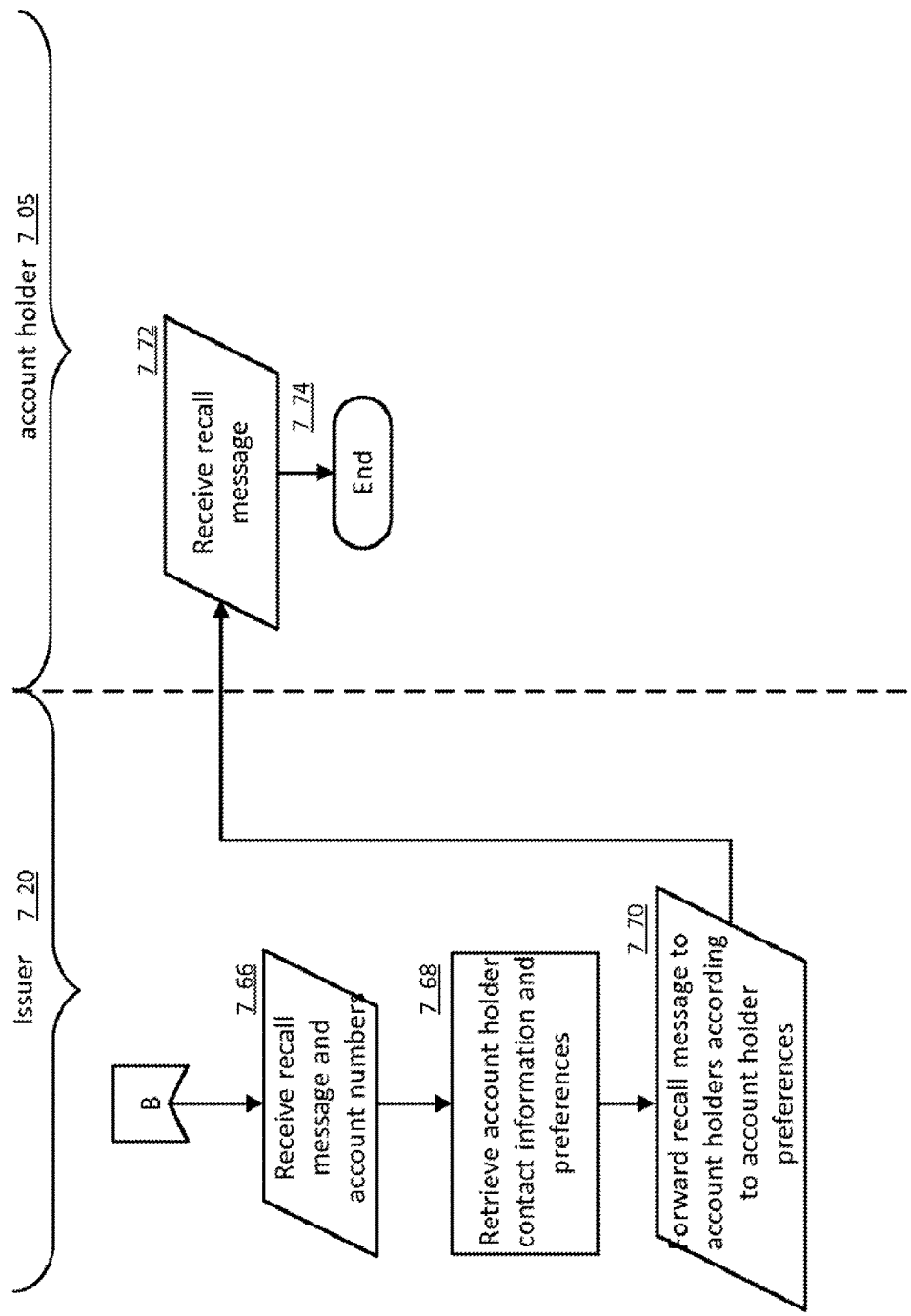
FIG. 7B  Example TID-Based Recall Notification (TRN) Component (contd.)

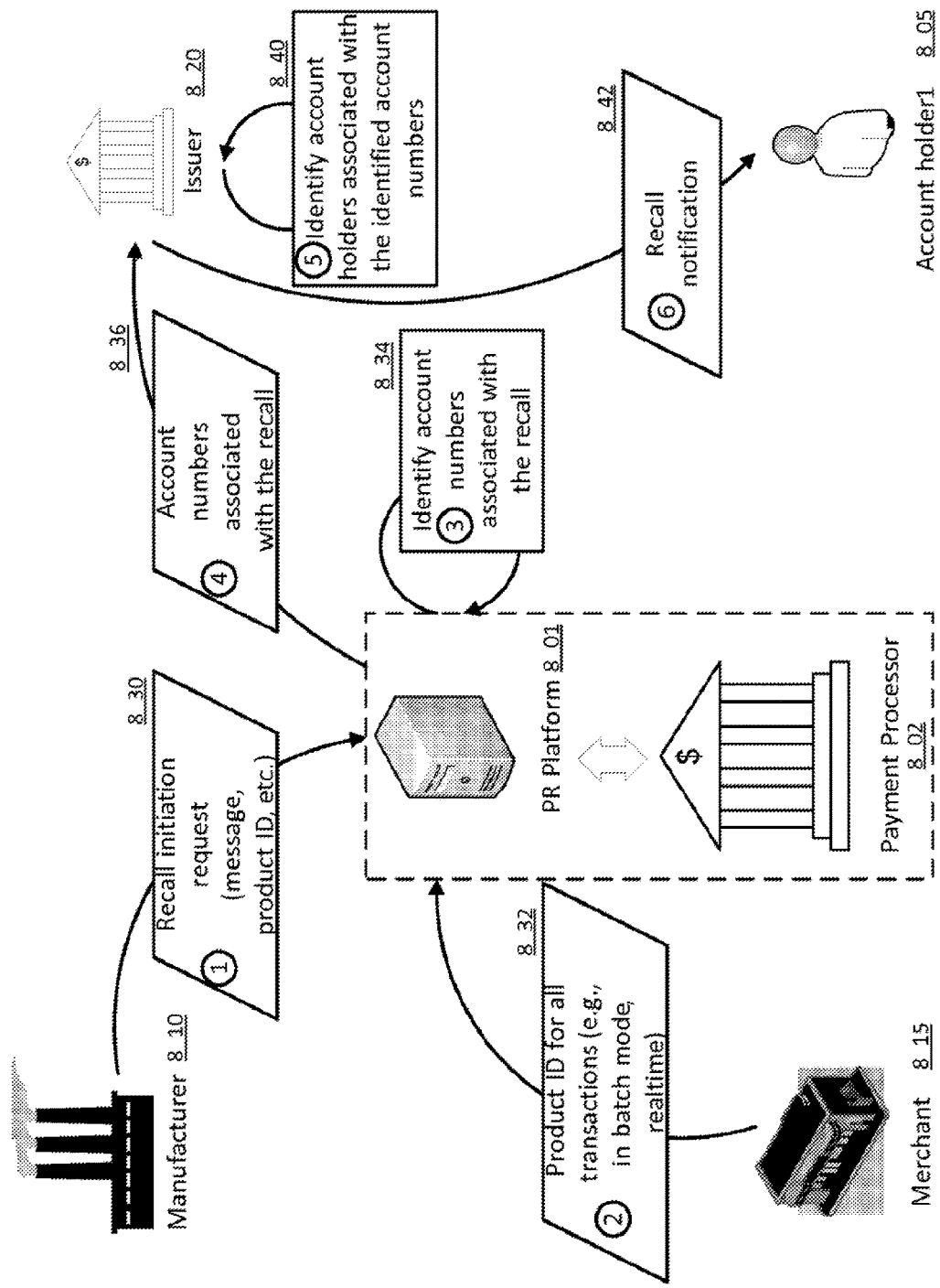
FIG. 8 Example Product ID-Based Recall Notification (PRN)

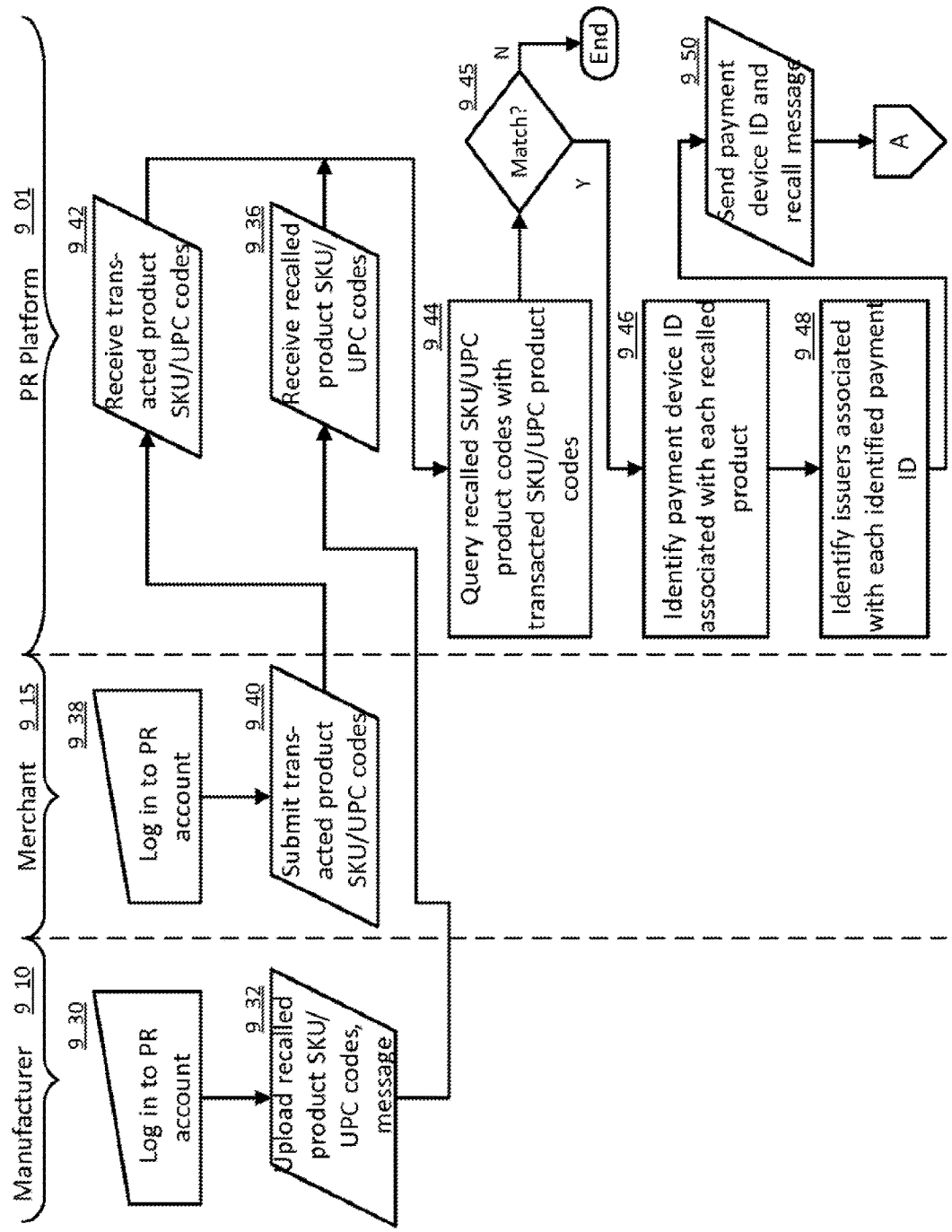
FIG. 9A  Example Product ID-Based Recall Notification(PRN) Component

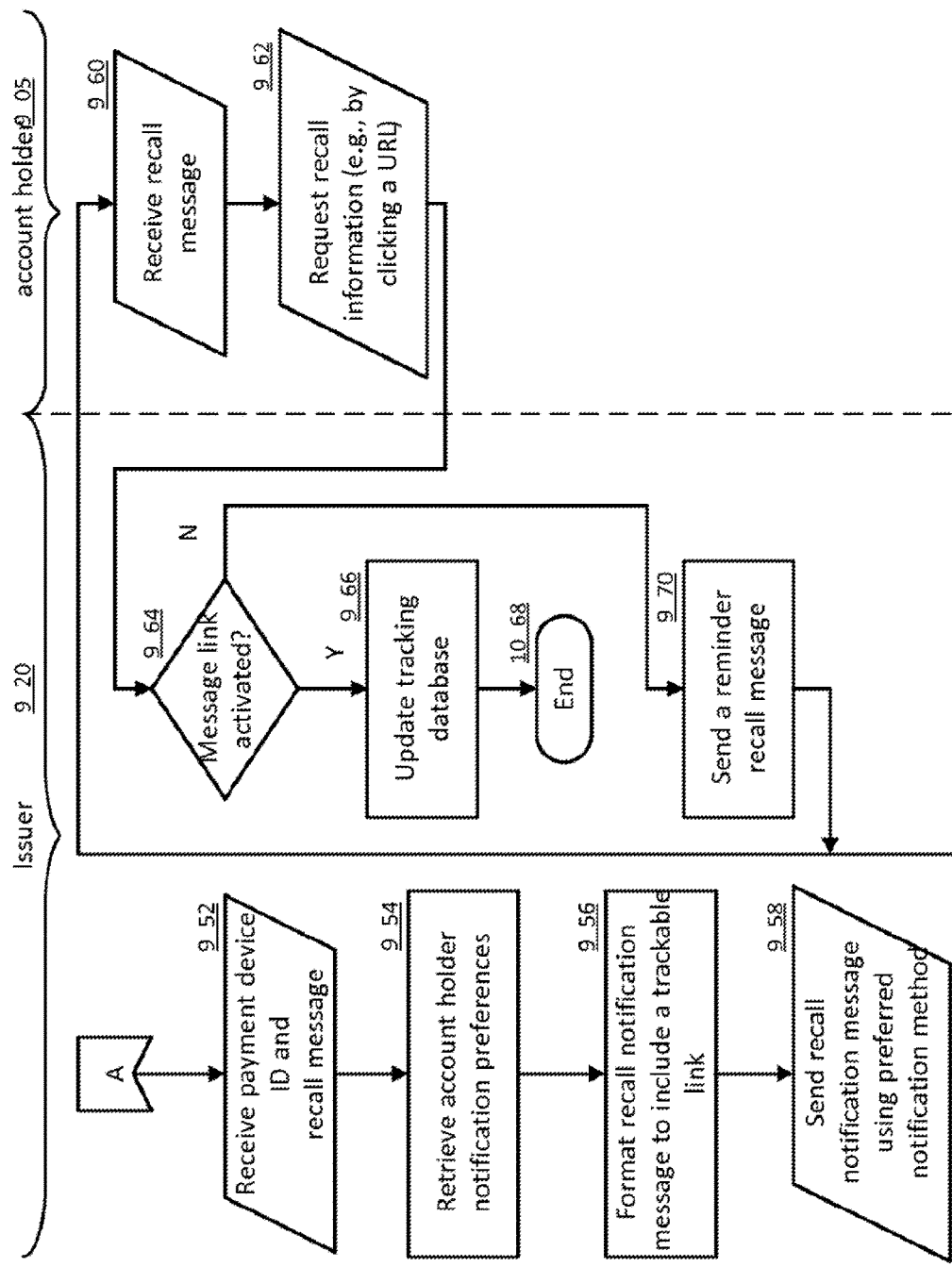
FIG. 9B Example Product ID-Based Recall Notification (PRN) Component (Contd.)

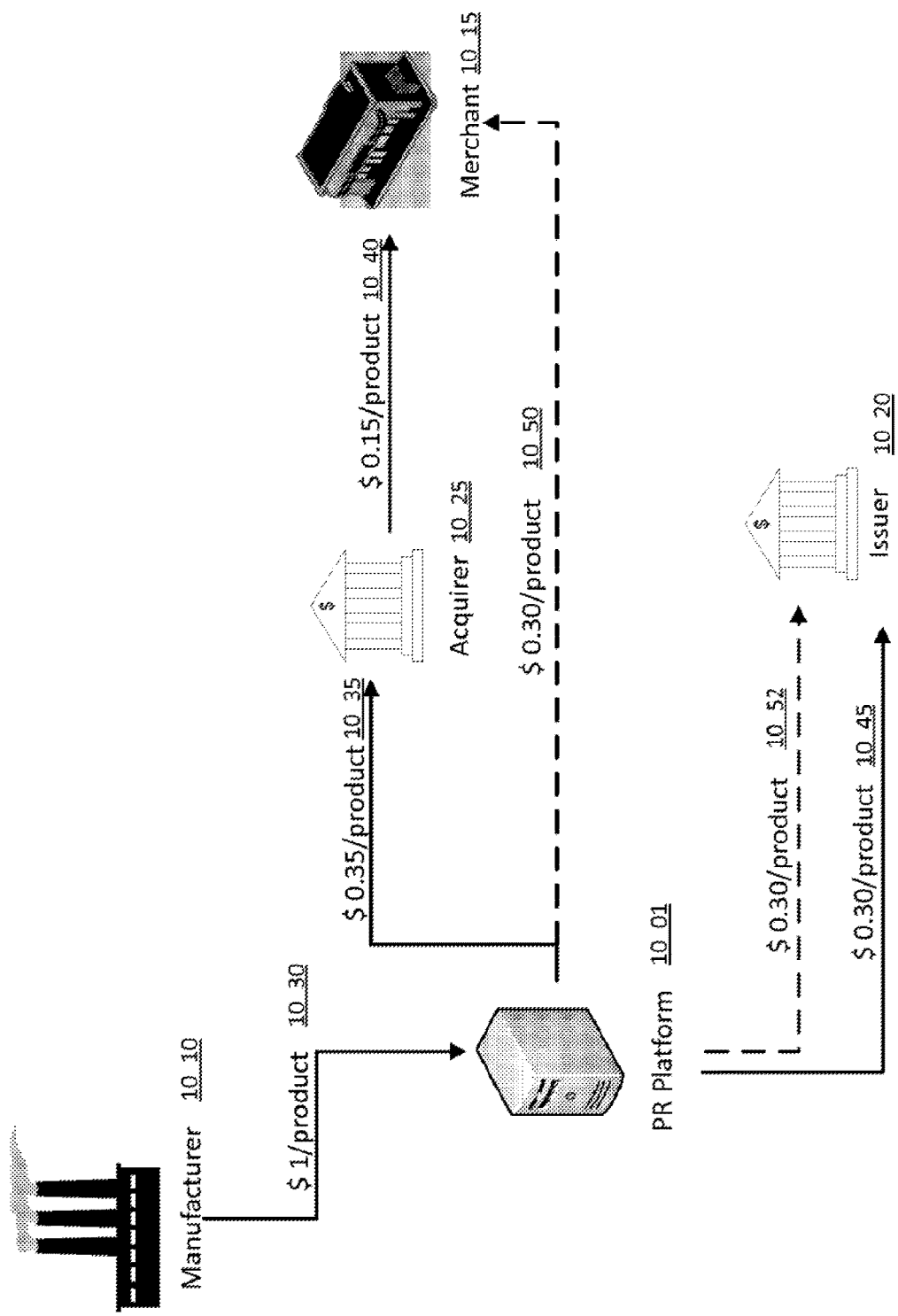
FIG. 10 Example Revenue Share

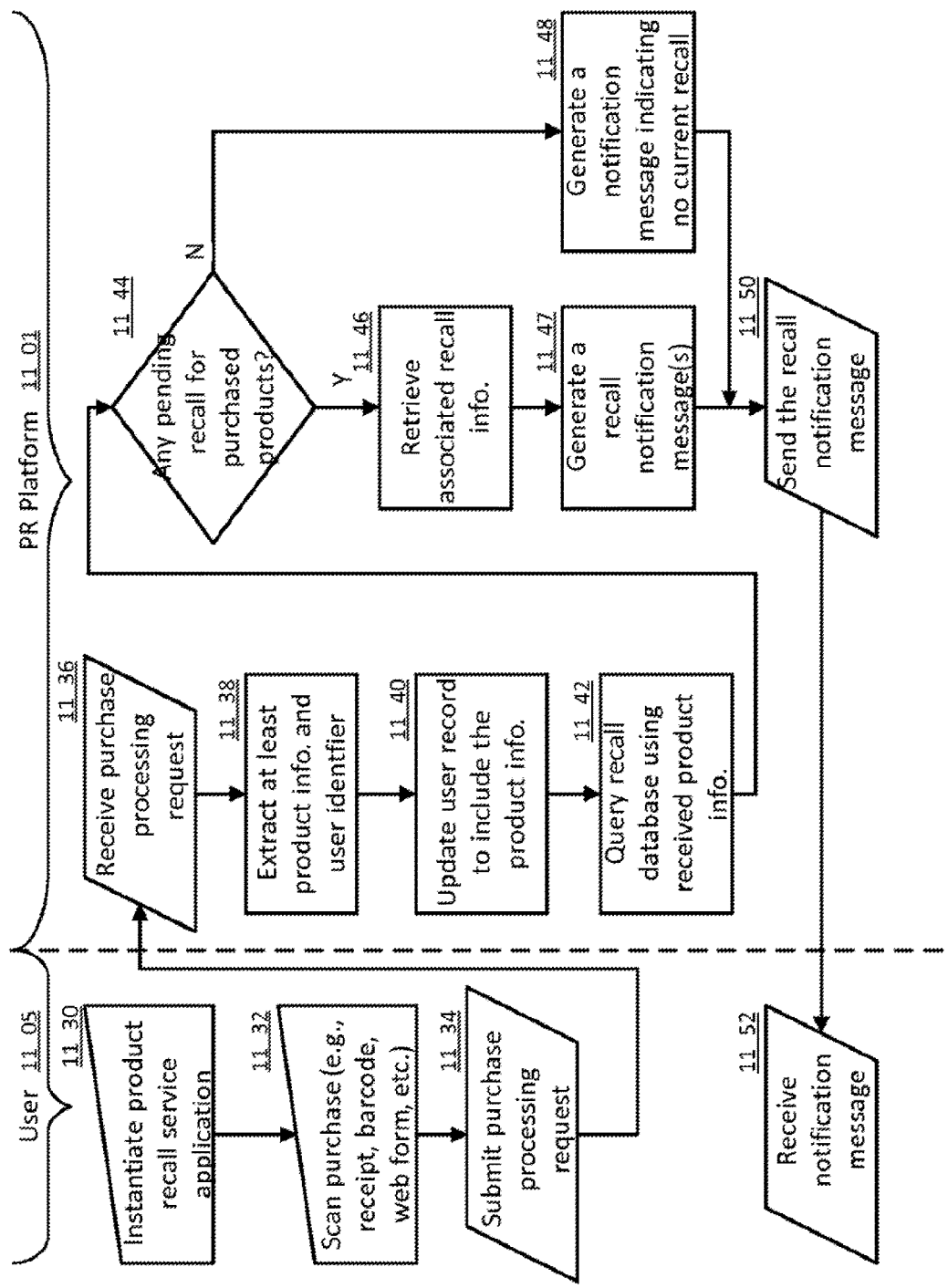
FIG. 11 Example User-Initiated Recall Notification (URN) Component

Example PR Platform Application User Interfaces

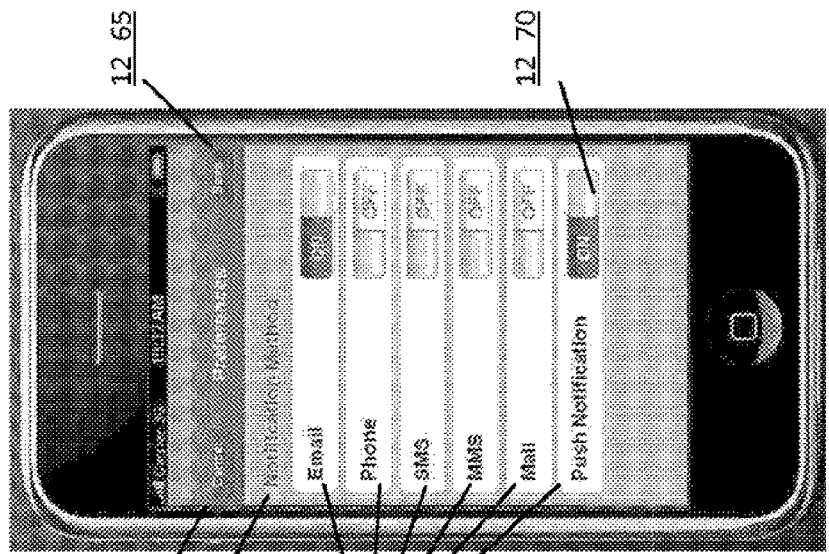
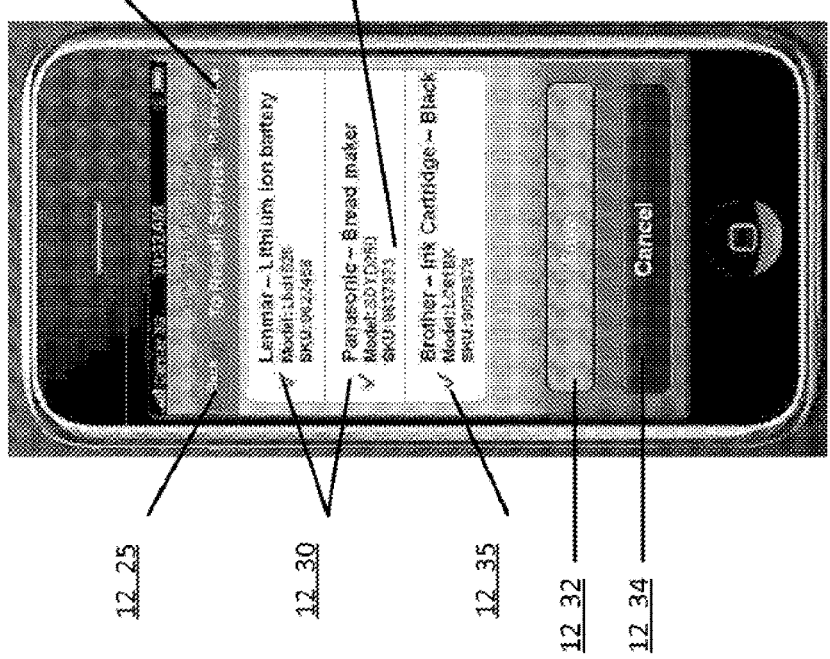
FIG. 12D
FIG. 12C
Example PR Platform Application User Interfaces Example: One-Tap Mobile App: Capturing Product Identifier Example: One-Tap Mobile App: Capturing Product Identifier

Figure 14(a) Example Purchase Registration Recall Notification User Interfaces Buybirdbuy.com

| Products ∨ | Services ∨ | Deals & Offers ∨ |

PURCHASE SUMMARY 1460

_____
SAVE FOR RECALL NOTIFICATION  1465

| Description | | Delivery Options | Quantity | Total |

Lithium ion battery  1470
Model: LAC9025
SKU: 9637273

● Shipping
○ Store Pickup 1    39.00

Product Total    : $39.00
Shipping         : Free
Tax @ 6.00%      : $2.34        1480
SUBTOTAL         : $41.34
Amount Paid Via VISA : $41.34

Billing Information 1475
Sasha_tomahitsu@gmail.com
Sasha Tomahitsu
200 Henry Street
Stamford, CT 06902

Figure 14(b) Example Purchase Registration Recall Notification User Interfaces

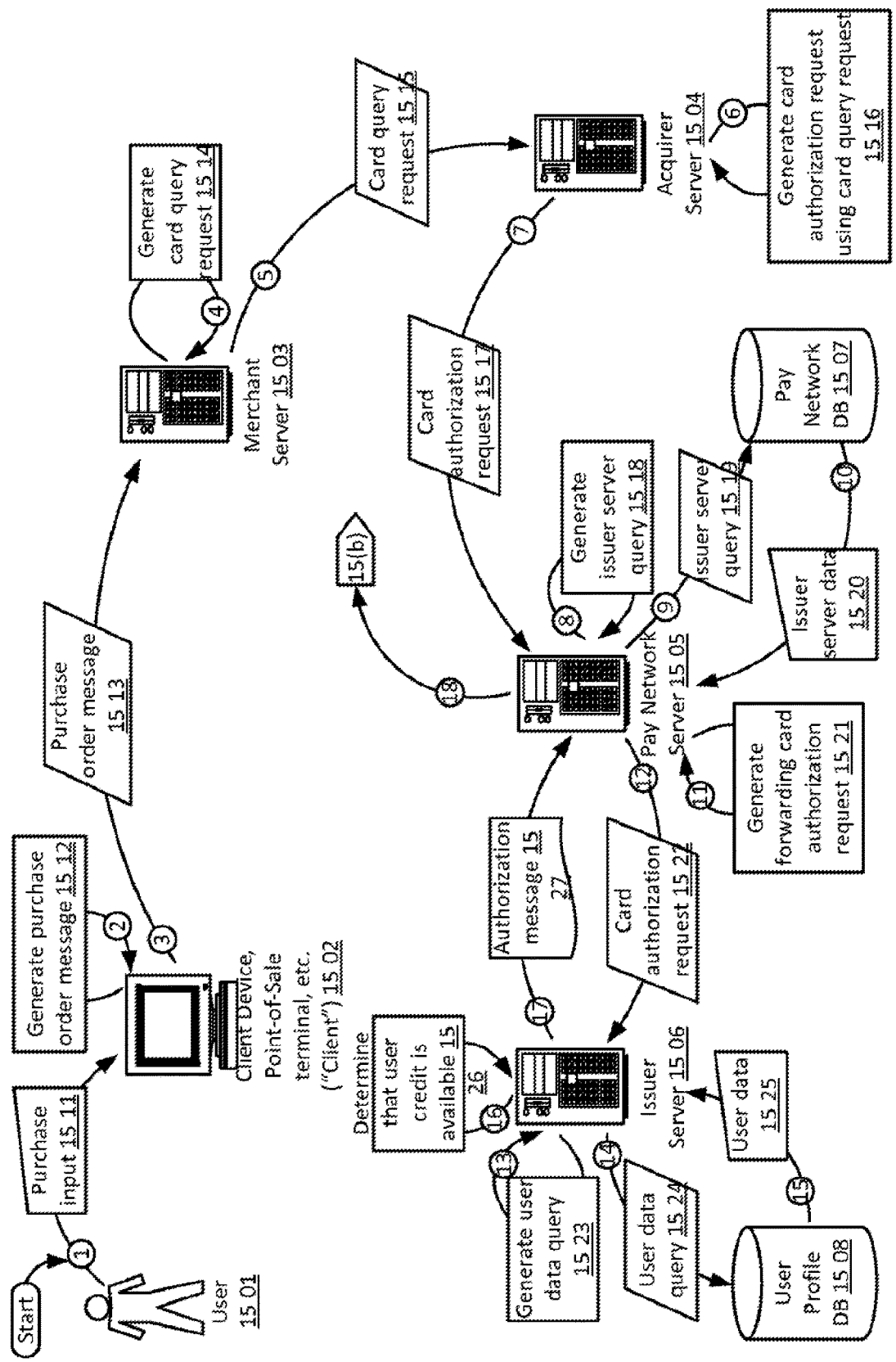
FIG. 15A  Example Data Flow: Card-Based Transaction Execution

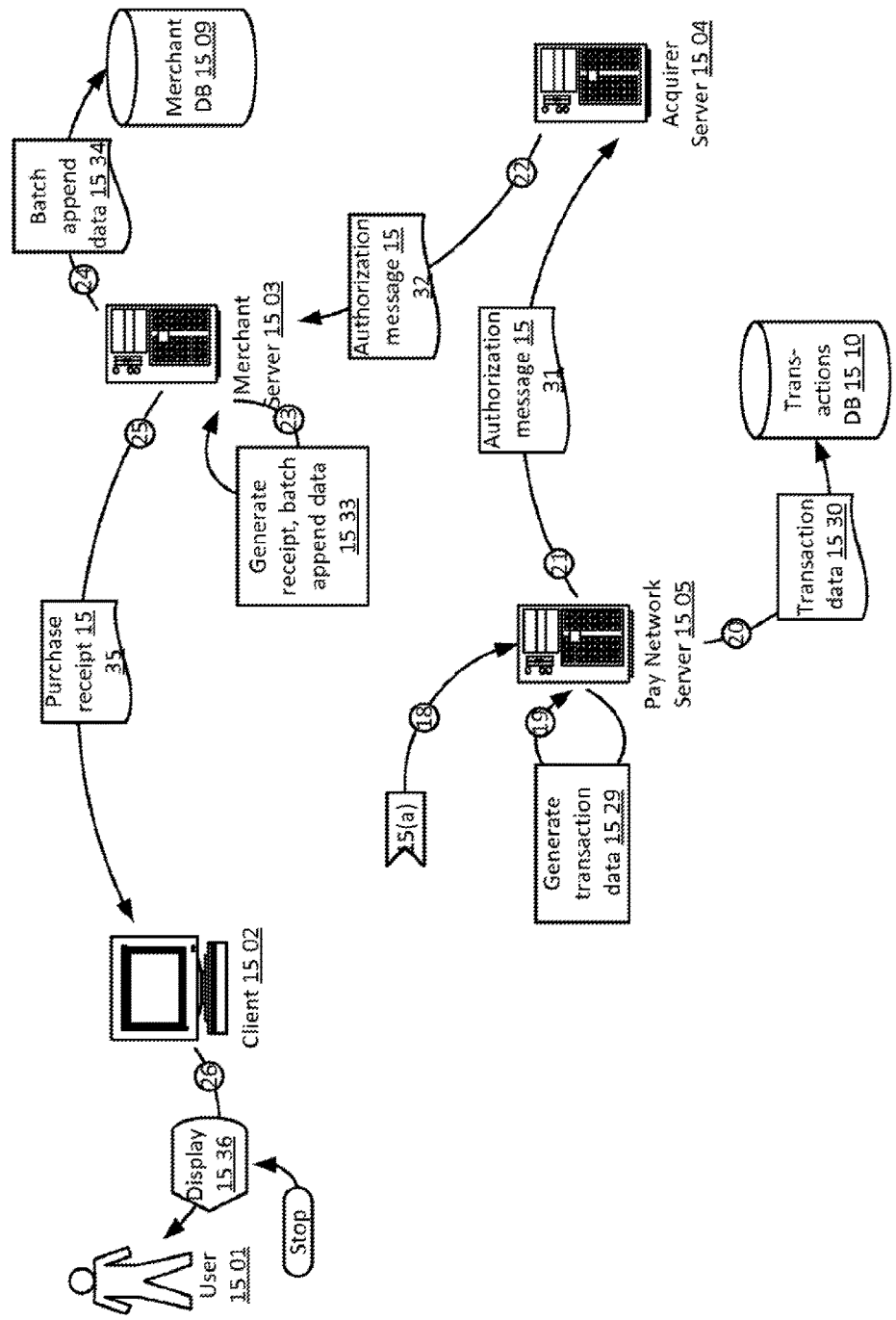
FIG. 15B   Example Data Flow: Card-Based Transaction Execution

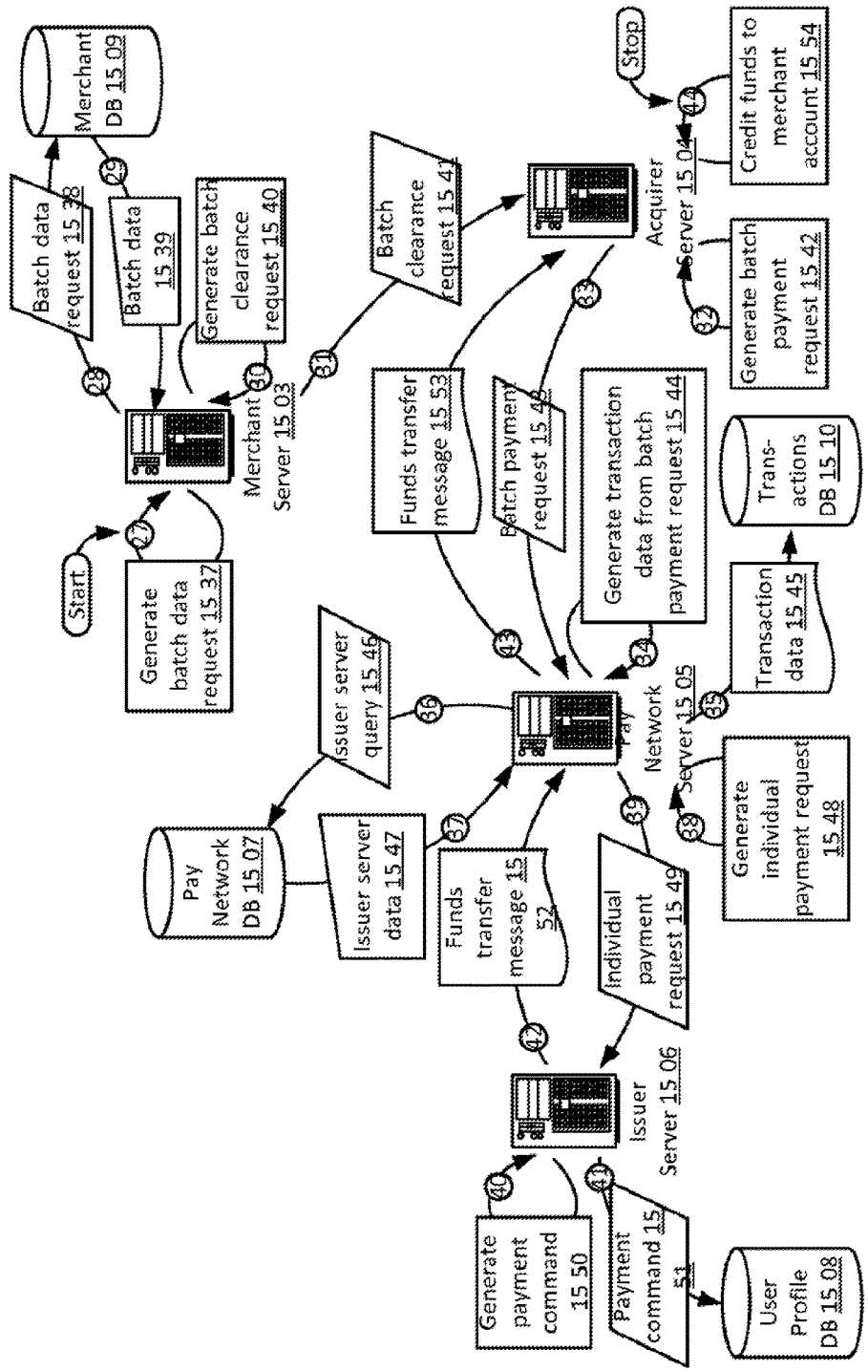
FIG. 15C  Example Data Flow: Card-Based Transaction Execution

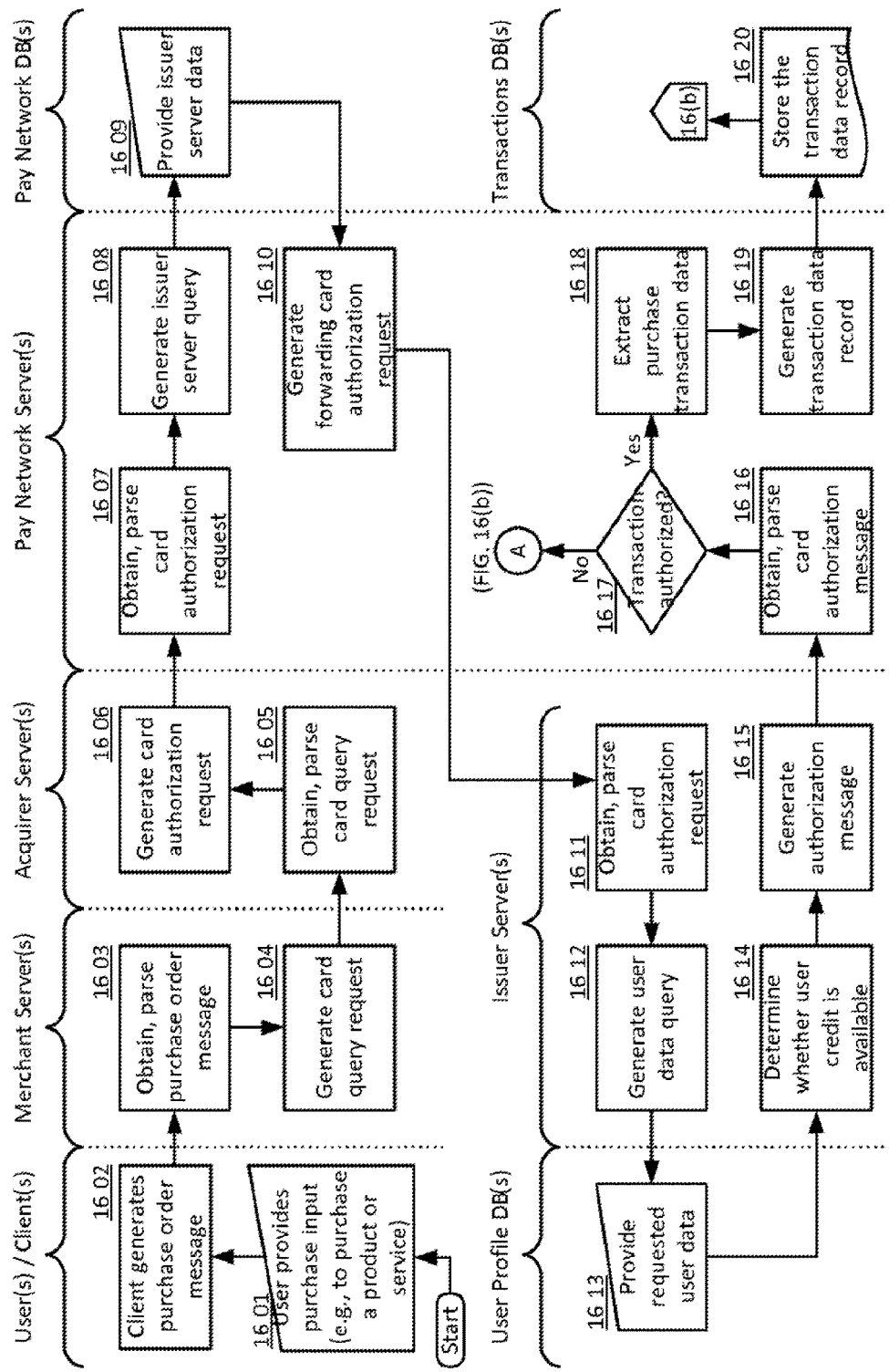
FIG. 16A  Example: Card-Based Transaction Execution (CTE) component

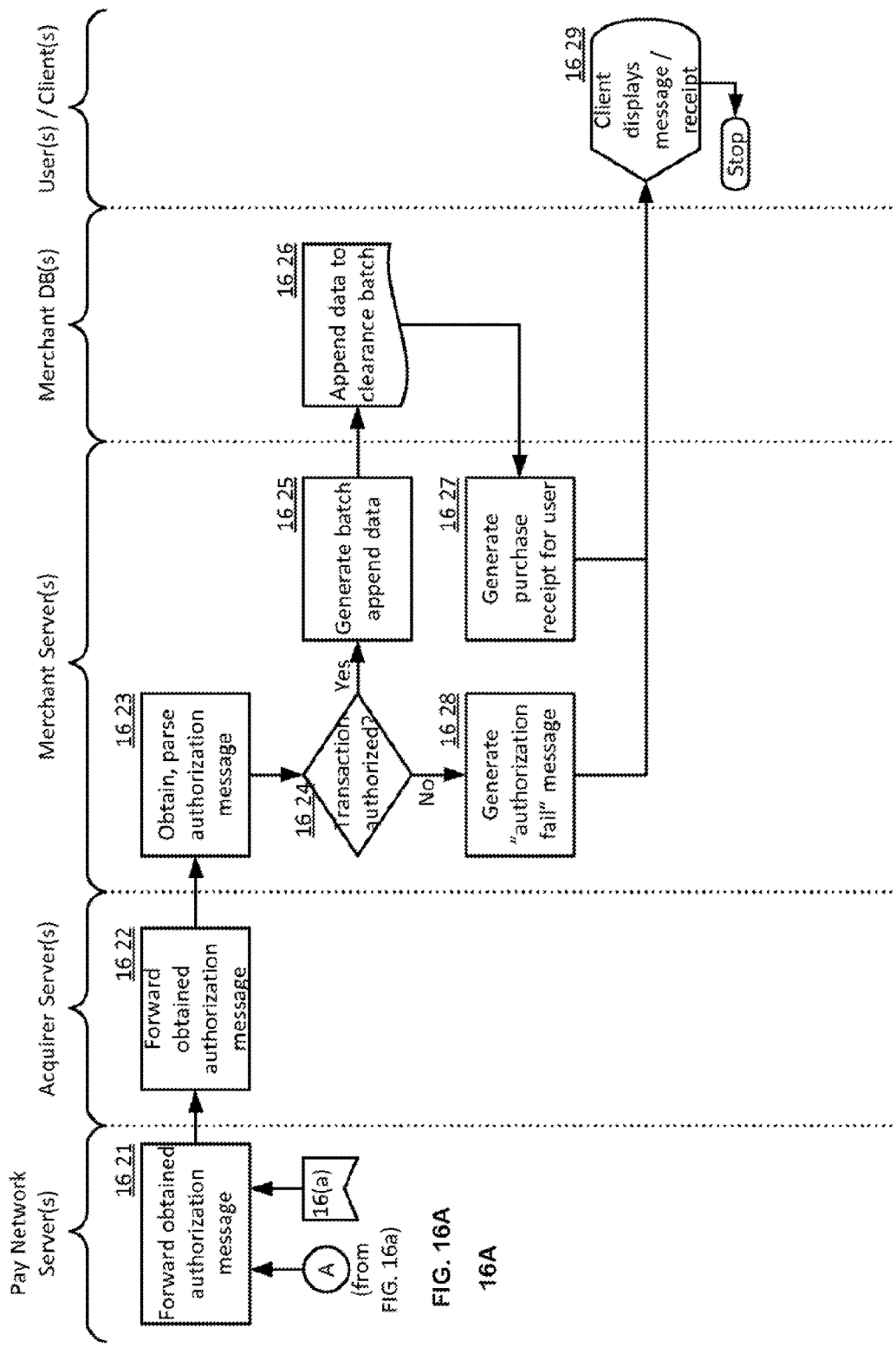
FIG. 16B    Example: Card-Based Transaction Execution (CTE) component

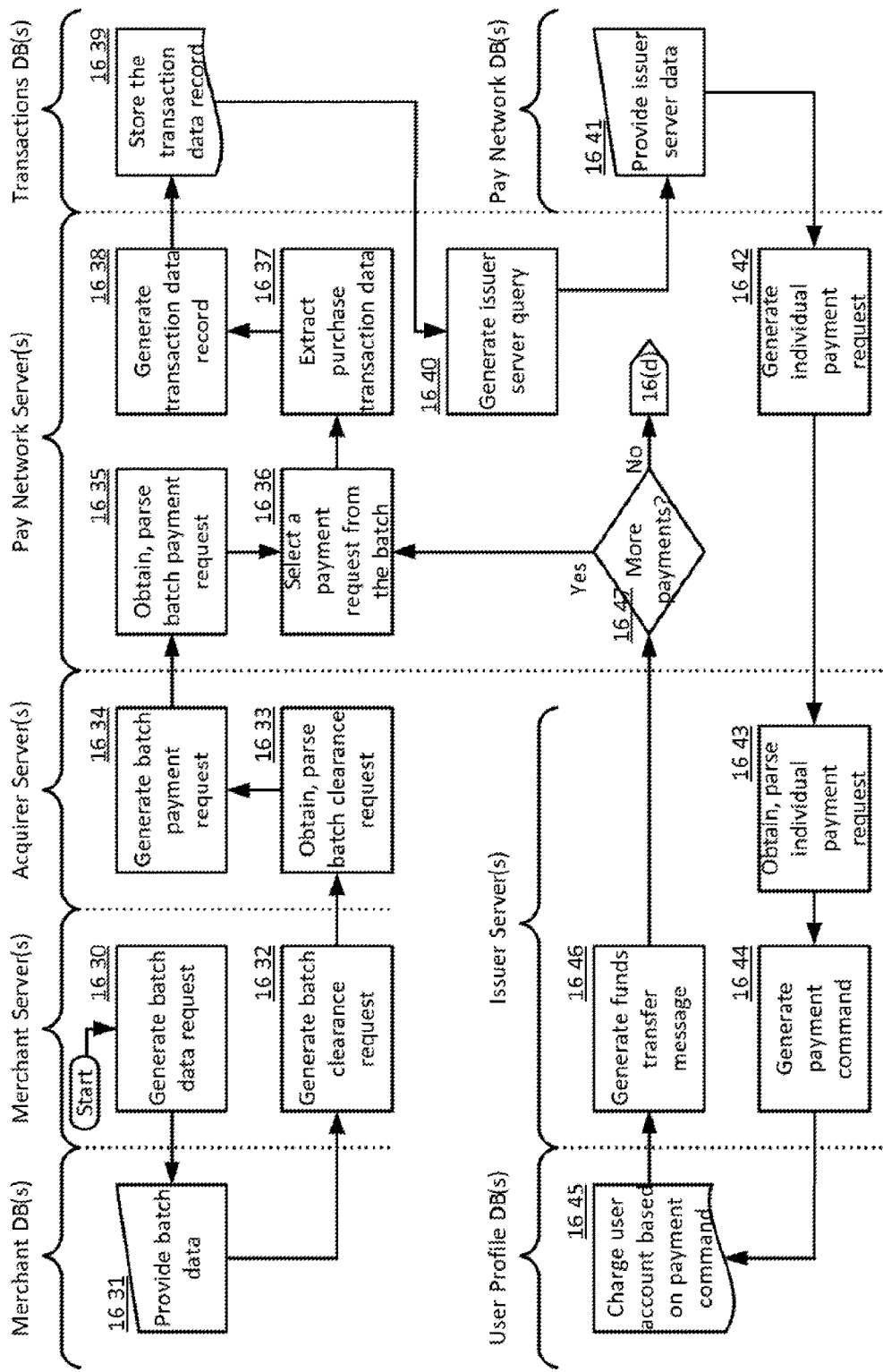
FIG. 16C    Example: Card-Based Transaction Execution (CTE) component

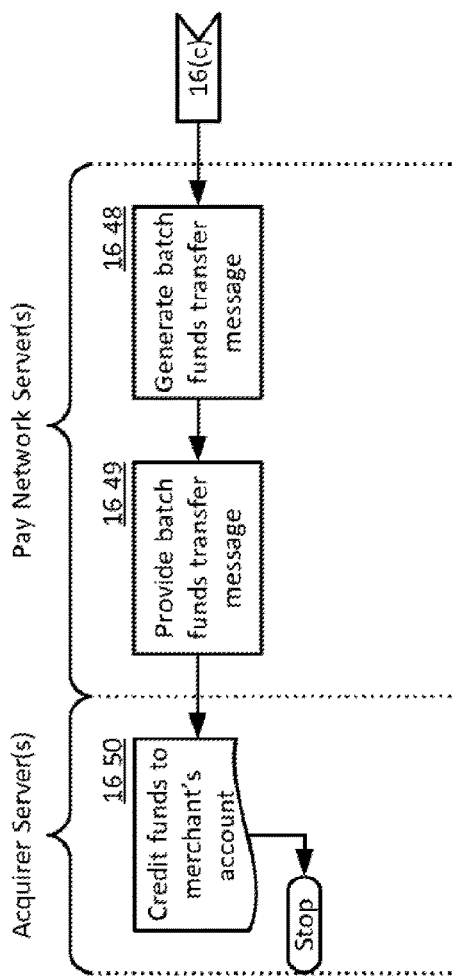
FIG. 16D  Example: Card-Based Transaction Execution (CTE) component

PRODUCT RECALL PLATFORM APPARATUSES, METHODS AND SYSTEMS

CROSS-REFERENCE TO RELATED APPLICATIONS

This is a divisional application of U.S. patent application Ser. No. 14/066,680, filed Oct. 29, 2013, which is a continuation application of U.S. patent application Ser. No. 13/101,083, filed May 4, 2011 and entitled "Product Recall Platform Apparatuses, Methods and Systems," which in turn claims priority under 35 USC § 119 to U.S. Provisional Patent Application Ser. No. 61/331,331 filed on May 4, 2010 and which is a Continuation-in-Part of U.S. patent application Ser. No. 12/770,607, filed on Apr. 29, 2010 and entitled "Product Recall Service," which in turn claims priority under 35 USC § 119 to U.S. Provisional Patent Application Ser. No. 61/293,359 filed on Jan. 8, 2010 and U.S. Provisional Patent Application Ser. No. 61/174,402, filed on Apr. 30, 2009. The entire contents of the aforementioned applications are herein expressly incorporated by reference.

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the patent disclosure document by anyone as it appears in published Patent Office file/records, but otherwise reserve all rights.

FIELD

The present innovations are directed generally to consumer product recalls and more particularly, to PRODUCT RECALL PLATFORM APPARATUSES, METHODS AND SYSTEMS.

BACKGROUND

Many products such as cars, toys, food items, equipment, etc., sold in the market are recalled when they are discovered to have safety issues or are not safe for use or consumption. Manufacturers of such unsafe products, upon discovering a safety issue, may implement a voluntary recall or may be required to initiate a recall whereby consumers who purchased the recalled products are requested to return the products for refund or exchange via publications and/or direct mail. Product recall process is often expensive and laborious, and may have a negative impact on the brand image.

BRIEF DESCRIPTION OF THE DRAWINGS

The accompanying appendices and/or drawings illustrate various non-limiting, example, innovative aspects in accordance with the present descriptions:

FIG. 1 shows a diagram illustrating an example consumer product recall in some embodiments of the PR Platform;

FIGS. 2A and 2B show block diagrams illustrating recall notification procedures in some embodiments of the PR Platform;

FIG. 3 shows a diagram illustrating types of products recalled in some embodiments of the PR Platform;

FIG. 4 shows a data flow diagram illustrating example recall in some embodiments of the PR Platform;

FIG. 5 shows a data flow diagram illustrating example recall party enrollment in some embodiments of the PR Platform;

FIG. 6 shows a data flow diagram illustrating example Transaction ID (TID) based recall notification component in some embodiments of the PR Platform;

FIGS. 7A and 7B show logic flow diagrams illustrating example transaction ID (TID) based recall notification component (TRN) in some embodiments of the PR Platform;

FIG. 8 shows a data flow diagram illustrating example Product ID based recall notification in some embodiments of the PR Platform;

FIGS. 9A and 9B show logic flow diagrams illustrating example Product ID based recall notification component (PRN) in some embodiments of the PR Platform;

FIG. 10 shows a data flow diagram illustrating example revenue. share in some embodiments of the PR Platform;

FIG. 11 shows a logic flow diagram illustrating example user-initiated recall notification component (URN) in some embodiments of the PR Platform;

FIGS. 12A, 12B, 12C and 12D show example application user interfaces in some embodiments of the PR Platform;

FIGS. 14A and 14B show example purchase registration recall notification user interfaces in some embodiments of the PR Platform;

FIGS. 15A, 15B and 15C show data flow diagrams illustrating an example procedure to execute a card-based transaction resulting in raw card-based transaction data in some embodiments of the PR Platform;

FIGS. 16A, 16B, 16C and 16D show logic flow diagrams illustrating example aspects of executing a card-based transaction resulting in generation of raw card-based transaction data in some embodiments of the PR Platform.

Figures 12A, 12B:
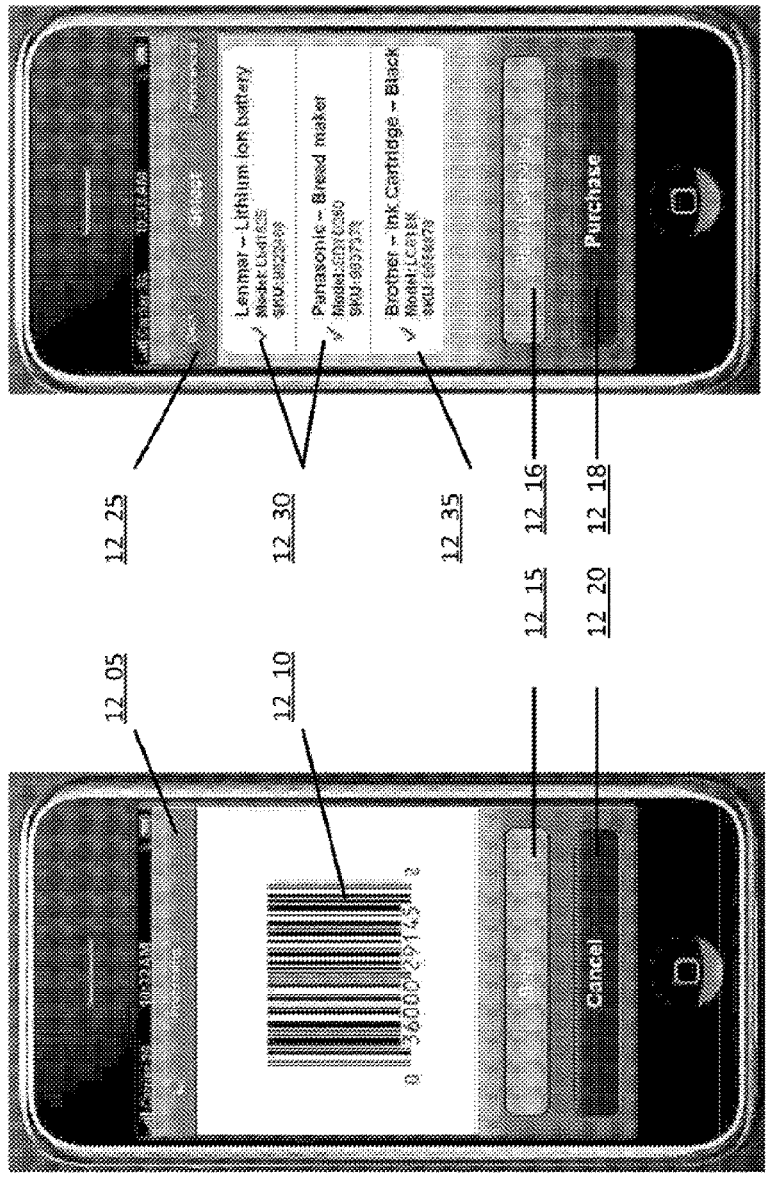

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Embodiments of the PR Platform provide cost effective and targeted notifications to consumers who have purchased a product that has been recalled by a manufacturer of the product. In one implementation, one or more of the following participants, including manufacturers, suppliers of products manufactured by others, merchants, acquirers or acquiring bank, issuers or issuing bank and account holders may be registered in the PR Platform. Each participating merchant may send, for delivery to the PR Platform, transaction data sufficient to identify each account holder making a purchase from the merchant as well as their purchased items. Each such purchased item may be part of a transaction conducted on an account issued to the account holder by an issuer, where the transaction was conducted by the merchant with the account holder. Payment to the merchant for the transaction may be authorized by the issuer to the merchant's acquirer, and may be cleared and settled through a payment processing system.

Upon recall notice received by the PR Platform from a participating supplier, where the recall notice identifies the supplier's recalled product, the PR Platform may match the recalled product against transaction data accumulated from participating merchant's transactions in order to locate those participating account holders who had purchased the recalled product. For each such match, contact information about the matching participating account holders may be used to send a notice. This notice may identify the recalled product and may contain a product recall message from the supplier to the account holders who had purchased the recalled product. The notice may also contain a request from the supplier to the account holders to return the product for a refund, for instance, by providing a phone number or e-mail address for account holders to contact the supplier or its agent. The notice may also provide an Internet address, which may be hosted by the PR Platform, at which the account holders may give and receive information about the recalled product. Such data, as was given to and received from account holders, may then be passed on to the supplier, or its agent, by the PR Platform.

Advantageously, the PR Platform need not make contact with a participating merchant every time a recall happens, and the merchant's acquirer need not be required to gather and match data against account holders who purchased a recalled product from the merchant. Rather, the merchant may send, for delivery to the PR Platform, transaction data information for items purchased in transactions by account holders, regardless of whether each such item has been recalled. Upon receipt, the PR Platform stores such transaction data along with data sufficient to identify, and derive contact information for, each account holder that is privy to each such transaction.

When a participating supplier announces a product recall to the PR Platform, there is no need to contact either the merchant or its acquirer in order to provide effective notice to the relevant account holders who had previously purchased the recalled product. As such, network traffic to both the merchant and its acquirer are not substantially increased by each product recall. Moreover, implementation costs to the acquirer are not substantial in working with the PR Platform to facilitate product recall notices to account holders.

Participating merchants acquire data at the time of each transaction with each account holder. The acquired data may be sufficient to identify both the account holder and each item purchased in the transaction. Such data may include, for the account holder, an account identifier issued by an issuer to the account holder, a transaction identification number (TID) for the transaction, the date and time of the transaction, a Point of Service terminal (POS) identifier, etc. Such data may include, for the item being purchased in the transaction, 'level three' data, product level data, or other data such as a Stock Keeping Unit (SKU), a Universal Product Code (UPC), a supplier's serial number, a supplier's batch and lot identifier, date and location of manufacture, etc.

These POS data may be sent directly to the PR Platform, or may be sent for delivery to the PR Platform via the merchant's acquirer and a transaction handler. These POS data may be sent in real time, or periodically in batch mode, and need not be part of a clearing and settlement process for the collection of the merchant's payment for a transaction.

The PR Platform may provide an incentive for account holders to be loyal to those merchants who receive and send such product level data as it enables account holders to enrich their participation in the PR Platform. Similarly, suppliers may be more favorably disposed to such merchants, or their acquirers, because of their capabilities as PR Platform participants.

In the event that a participating account holder has one or more accounts that are closed or otherwise become unusable for future transactions, the PR Platform can be so notified of such an event by its account holder, by its issuer, or by a credit rating service (i.e., Experian, TransUnion, Equifax, etc.) that keeps credit histories based on social security numbers or other globally unique identifiers for consumers. Also, the PR Platform may detect inactivity in the account for a predetermined time threshold. In such cases, the PR Platform may attempt to contact the participating account holder to continue the recall service, and retain the accumulated data about products purchased by the account holder, despite the closing or lack of future usefulness of the account holder's account.

In one implementation, an account holder can self register with the PR Platform for some or all of the accounts that they hold such that the respective issuers of these accounts need not register the account holder with the PR Platform. Moreover, the account holder can continually update the PR Platform with purchases of products made at non-participating merchants, as well as continually updating their contact information along with chronologically opened and closed account information. These updates enable the PR Platform to retain product purchase information about the participating account holder which can be used to timely notice of product recalls to participating account holder. Self registration by an account holder, and ongoing maintenance of account holder information, can be accomplished, for instance, by an online registration service, such as at a website hosted by the PR Platform or its agent. Accordingly, self registration allows an account holder to be free of its issuers and still be notified of about its purchased products that have been recalled, even if the account holder no longer has a banking relationship with an issuer who issued an account to the account holder upon which a recalled product was purchased. Accordingly, and for example, such an account holder may receive a product recall notice many years after the recalled product was purchased by the account holder, even though the account used by the account holder to purchase the product was closed many year ago. Advantageously, data acquired and maintained by the PR Platform may be mined for other purposes beneficial to registered participants with the PR Platform. For instance, a participating supplier may want to send a notice of all participating account holders residing in a particular geographic area who have purchased its participating products, such as to announce a special event at on a particular date and time in that geographic area.

In one implementation, the PR Platform may facilitate demographic, location and temporal data acquisition and analysis. For example, one or more analyses of the acquired data from manufacturers, issuers, merchants, acquirers and/or account holders may be utilized for targeting consumers, and product batch tracking. In another implementation, the PR Platform may recognize consumers who make numerous purchases of the same item, and may identify such consumers as secondary retailers. The PR Platform may then prompt such secondary retailers to utilize the facilities of the PR Platform for their customers to facilitate recall tracking and notification. In another implementation, the PR Platform may facilitate coordination and analysis of multiple data sets. For example, a user may register a product with a manufacturer for rebate, warranty, promotion or other purposes. The PR Platform may carry out reconciliation of data sets from the manufacturer, user or other parties to ensure that the user does not get duplicate or multiple recall notifications. As such, the PR Platform may perform various functions and serve in various capacities.

In one implementation, a web-based registration system could be used for suppliers to provide the information on the recalled products (e.g., SKU/UPC code, etc.) and the recall notification message contents. Other entities may also use this web-based system to register their participation in the PR Platform, as well as for other services such as receiving reports made available via this interface (e.g., related billing and operational information pertaining to PR Platform participants).

Issuers may register their account holders and acquirers may register their merchants for participation in a PR Platform via a network interface. Participating merchants may send product level data for some or all items for some or all transactions to the PR Platform via a network interface. For example, product level data may be sent from the participating merchant to its acquirer for forwarding to transaction handler and from the transaction to the PR Platform, where the transaction may be authorized, cleared, and settled in a payment processing system.

Participating suppliers may submit product identifiers of recalled products along with verbiage to be provided to account holders or consumers ('return-to' or 'contact-us' information) via the PR Platform. To do so, a supplier may submit an identifier for each product, such as an SKU/UPC, serial number, etc. Alternatively, each such identifier may be submitted either before or after the corresponding product is recalled. The supplier may also provide verbiage to be provided to account holders (i.e.; return-to, contact-us information, etc.)

The PR Platform may work in conjunction with the transaction handler to match the product identifier for a recalled product against the product level data accumulated from transactions between merchants and account holders. With the finding of the recalled product matches in the transaction data, the PR Platform, working in conjunction with the transaction handler, may derive and use other information from the matching transaction data. For instance, by mining the matching transaction data, the PR Platform may assign Globally Unique Identifiers (GUIDs) that characterize and specify the product recall. For instance, the particular product(s) that were purchased by a particular account holder may each be assigned a recalled product GUID. The particular transaction in which the particular product(s) were purchased by the particular account holder may be assigned a transaction GUID. The particular merchant that sold the particular product(s) to that particular account holder can be assigned a merchant GUID. The particular location at which the particular merchant sold the particular product(s) to the particular account holder may be assigned a merchant location GUID. Each such GUID can be communicated to the particular account holder and/or the supplier. Upon receipt, the GUIDs may be used by a supplier of a recalled product to take measures to limit personal injury and property damage.

A notice may sent to each issuer having one or more accounts upon which there had been a transaction conducted for the purchase of a product with a matching product identifier of a recalled product. The notice sent to the issuer may contain recall notification verbiage provided by the supplier for delivery to the issuer's account holders who conducted the corresponding transactions for the purchase of a recalled product, and may also include the recalled product GUID.

The recall notification verbiage is sent from the issuers to their respective account holders who conducted the corresponding transactions for the purchase of a recalled product, and may also include a respect recalled product GUID. The recall notification verbiage can be sent to each account holder via statement message, e-mail, direct mail, text or web message, or other method.

The transaction handler, the PR Platform, or their agent, may collect a fee from the supplier for product recall message delivery services and may distribute all or respective portions thereof to each participating entity that assisted in the product recall message delivery service. By way of example, the fee can be a product recall service fee that is collected from a supplier of a product that has been recalled product. A portion of each such product recall service fee may be paid to each issuer who had issued an account that was used by an account holder to purchase the corresponding recalled product. The issuer may send a recall notice to each such account holder, where the fee received by the issuer may be deemed to be compensation for such product recall notifications to its account holders.

Each account holder may access a PR Platform network interface to send data to and receive data from the supplier and/or the PR Platform which may pertain to a previously purchased recalled product. By way of example, and not by way of limitation, the account holder may use a web-enabled device to access the PR Platform network interface via the Internet, such as via a user interface having an interactive display screen. Such access by the account holder may require the input of the recalled product GUID as received in the product recall notice.

The PR Platform may facilitate registration from (i) suppliers; (ii) from account holders; and (iii) from merchants and/or from acquirers for their participating merchants. Registered merchants may send data from transactions with account holder, where each transaction is authorized, cleared, and settled in a payment processing system. The data from these transactions may be sufficient to identify: account holders to the PR Platform, with an option to send these data to the PR Platform via the merchant's acquirer and the transaction handler, or with an option where the merchant may send these data directly to the PR Platform. The registered merchants may send transaction data that identifies purchased items for, an option where all items in all transactions, an option where some items of the items in all transactions, or an option wherein some of the items in some of the transactions. In one implementation, only some items may be 'participating' items in a product recall service, where participating item are so qualified, for instance, by: product level data received by the merchant at the merchant's POS such that these data may be sent to the PR Platform, by a participating entity (i.e.; a supplier, an account holder, a merchant, an issuer) who requested that transactions for the purchase of certain items be tracked by the PR Platform, a governmental agency required that transactions for the purchase of certain items be tracked by the PR Platform, and/or the like.

Participating suppliers may submit product identifiers of recalled products along with verbiage to be provided to account holders consumers ('return-to' or 'contact-us' information) to a network interface for the PR Platform. To do so, a supplier may submit an identifier for each product, such as an SKU, UPC, serial number, etc. Alternatively, each such identifier may be submitted either before or after the corresponding product is recalled. The supplier may also provide verbiage to be provided to account holders (i.e.; return-to, contact-us information, etc.)

The PR Platform may work in conjunction with the transaction handler to accumulated from transaction between merchants and account holders. With the finding of the recalled product matches in the transaction data, the PR Platform, working in conjunction with the transaction handler, may derive and use other information from the matching transaction data. For instance, by mining the matching transaction data, the PR Platform may assign Globally Unique Identifiers (GUIDs) that characterize and specify the product recall. For instance, the particular product(s) that were purchased by a particular account holder may each be assigned a recalled product GUID. The particular transaction in which the particular product(s) were purchased by the particular account holder may be assigned a transaction GUID. The particular merchant that sold the particular product(s) to that particular account holder may be assigned a merchant GUID. The particular location at which the particular merchant sold the particular product(s) to the particular account holder may be assigned a merchant location GUID. Each such GUID can be communicated to the particular account holder and/or the supplier.

A notice may be sent to each matching participating account holder from the PR Platform who has conducted a transaction on an account for the purchase of a product with a matching product identifier of a recalled product. The notice sent to the account holder may contain recall notification verbiage provided by the supplier for delivery to the account holder who conducted the corresponding transaction for the purchase of a recalled product, and may also include a respect recalled product GUID. The recall notification verbiage may be sent to each account holder via statement message, e-mail, direct mail, web message or other method. The recall notification verbiage may be received by the respective account holders who conducted the corresponding transactions for the purchase of a recalled product.

Alternatively, the recall notification verbiage may also include an identifier that uniquely identifies the account holder to whom the recall notification verbiage was sent, also known as the account holder's Globally Unique Identifier (GUID). When the account holder contacts the PR Platform, the account holder's GUID may be supplied to the PR Platform so that the PR Platform can associate the account holder with a product that had been recalled. The PR Platform may also send the account holder's GUID to the supplier of the recalled product. As such, the supplier may be able to associate the account holder, via the account bolder's GUID, with the supplier's product that had been recalled and was purchased by the account holder.

Each account holder may access a PR Platform network interface to send data to and receive data from the supplier and/or the PR Platform which may pertain to a previously purchased recalled product. By way of example, and not by way of limitation, the account holder may use a web-enabled device to access the PR Platform network interface via the Internet, such as via a user interface having an interactive display screen. Such access by the account holder may require the input of the recalled product GUM as received in the recall notice. The transaction handler, the PR Platform, or their agent, may collect a fee from the supplier for product recall message delivery services and distributes all or respective portions thereof to each participating entity that assisted in the product recall message delivery service.

An exemplary interactive user interface display screen may be accessible the finding of the recalled product matches in the transaction data, the PR Platform, working in conjunction with the transaction handler, may derive and use other information from the matching transaction data. For instance, by mining the matching transaction data, the PR Platform may assign Globally Unique Identifiers (GUIDs) that characterize and specify the product recall. These data may then be communicated with the account holder, the supplier, etc. For instance, the particular product(s) that were purchased by a particular account holder can each be assigned a recalled product GUID for rendering on the display screen. The particular transaction in which the particular product(s) were purchased by the particular account holder can be assigned a transaction GUID for rendering on the display screen. The particular merchant that sold the particular product(s) to that particular account holder can be assigned a merchant GUID for rendering on the display screen. The particular location at which the particular merchant sold the particular product(s) to the particular account holder can be assigned a merchant location GUID for rendering on the display screen.

The account holder may input a personal injury report and/or a property damage report on the display screen. With receipt of input from the account holder on the display screen, the PR Platform may assign a recalled product incident GUID that is communicated for future reference to the supplier. Optionally, the account holder's GUID may be auto-populated or can be supplied as input the account holder. Recalled product supplier verbiage, and an image of the recalled product, as may be suggested by the supplier of the recalled product, may be rendered on the display screen. A user of a web-enable device that renders the display screen may scroll the rendered imaged horizontally by using virtual navigation tool and vertically by wing virtual navigation tool as in common in interactive applications.

Payment processing system has a plurality of accounts each of which is held by a corresponding account holder. A transaction may include participation from different entities that are each a component of the payment processing system. The payment processing system may have a plurality of merchants. Payment processing system may include account user. Each account user may conduct a transaction with merchant for goods and/or services using the account that has been issued by an issuer to a corresponding account holder. Data from the transaction on the account may be collected by the merchant and forwarded to a corresponding acquirer. Acquirer may forwards the data to transaction handler who may facilitate payment for the transaction from the account issued by the issuer to account holder. Payment processing system may include a plurality or transaction handlers (not shown) for respective acquirers and issuers, each participating in one or more product recall services or the same product recall service.

Payment processing system may have a plurality of issuers. Each issuer may be assisted in processing one or more transactions by a corresponding agent issuer. Payment processing system may have a plurality of acquirers. Each acquirer may be assisted in processing one or more transactions by a corresponding agent acquirer.

The transaction handler may process a plurality of transactions within the payment processing system. The transaction handler may include one or a plurality or networks and switches (e.g., a mainframe computer). Dedicated communication systems may facilitate communication between the transaction handler and each issuer and each acquirer. The Network, via e-mail, the World Wide Web, cellular telephony, and/or other optionally public and private communications systems, can facilitate communications among and between each issuer, each acquirer, each merchant, each account holder, and the transaction handler.

Merchant may be a person or entity that sells goods and/or services. Merchant may also be, for instance, a supplier, a distributor, a retailer, a load agent, a drugstore, a grocery store, a gas station, a hardware store, a supermarket, a boutique, a restaurant, a doctor's office, and/or the like. The merchant may conduct business online (e.g., AMAZON, E-BAY, etc.), may be a store front business (e.g., MACYS, WHOLE FOODS, etc.) or both. In a business-to-business setting, the account holder may be a second merchant making a purchase from another merchant. Merchant may utilize at least one point-of-interaction terminal (e.g., Point of Service, browser enabled consumer cellular telephone, tablets, computers, mobile devices, and/or the like) to communicate with the account user, the acquirer, the transaction handler, or the issuer. The point-of-interaction terminal may be in operative communication with the payment processing system.

The portable consumer device may be in a form factor that may be a payment card, a gift card, a smartcard, a smart media, a payroll card, a healthcare card, a wrist band, a machine readable medium containing account information, a keychain device, such as a SPEEDPASS® device commercially available from ExxonMobil Corporation, a supermarket discount card, a cellular telephone, personal digital assistant, a pager, a security card, an access card, a wireless terminal, or a transponder. The portable consumer device may include a volatile or non-volatile memory to store information such as the account number or an account holder's name.

Merchant may use the point-of-interaction terminal to obtain account information, such as a number of the account of the account holder, from the portable consumer device. The portable consumer device may interface with the point-of-interaction terminal using a mechanism including any suitable electrical, magnetic, or optical interfacing system such as a contactless system using radio frequency or magnetic field recognition system or contact system such as a magnetic stripe reader. The point-of-interaction terminal sends a transaction authorization request to the issuer of the account associated with the portable consumer device. Alternatively, or in combination, the portable consumer device may communicate with issuer, transaction handler, or acquirer.

Issuer may authorize the transaction and forward same to the transaction handler. Transaction handler may also clear the transaction. Authorization may include issuer, or transaction handler on behalf of issuer, authorizing the transaction in connection with issuer's instructions such as through the use of business rules. The business rules may include instructions or guidelines from the transaction handler, the account holder, the merchant, the acquirer, the issuer, a related financial institution, or combinations thereof. The transaction handler may maintain a log or history of authorized transactions. Once approved, the merchant may record the authorization, allowing the account user to receive the good or service from merchant or an agent thereof.

The merchant may, at discrete periods, such as the end of the day, submit a list of authorized transactions to the acquirer or other transaction related data for processing through the payment processing system. The transaction handler may compare the submitted authorized transaction list with its own log of authorized transactions. The transaction handler may route authorization transaction amount requests from the corresponding the acquirer to the corresponding issuer involved in each transaction. Once the acquirer receives the payment of the authorized transaction from the issuer, the acquirer may forward the payment to the merchant less any transaction costs, such as fees for the processing of the transaction. If the transaction involves a debit or pre-paid card, the acquirer may choose not to wait for the issuer to forward the payment prior to paying merchant.

There may be intermittent steps in the foregoing process, some of which may occur simultaneously. For example, the acquirer may initiate the clearing and settling process, which can result in payment to the acquirer for the amount of the transaction. The acquirer may request from the transaction handler that the transaction be cleared and settled. Clearing may include the exchange of financial information between the issuer and the acquirer and settlement includes the exchange of funds. The transaction handler may provide services in connection with settlement of the transaction. The settlement of a transaction includes depositing an amount of the transaction settlement from a settlement house, such as a settlement bank, which transaction handler typically chooses, into a clearinghouse, such as a clearing bank, that acquirer typically chooses. The issuer may deposit the same from a clearinghouse, such as a clearing bank, which the issuer typically chooses, into the settlement house. Thus, a typical transaction may involve various entities to request, authorize, and fulfill processing of the transaction.

The payment processing system may have network components suitable for scaling the number and data payload size of transactions that may be authorized, cleared and settled in both real time and batch processing. These include hardware, software, data elements, and storage network devices for the same. Examples of payment processing system include those operated, at least in part, by: American Express Travel Related Services Company, Inc; MasterCard International, Inc.; Discover Financial Services, Inc.; First Data Corporation; Diners Club International, LTD; Visa Inc.; and agents of the foregoing.

The payment processing system may include data centers for processing transactions, where each transaction may include up to 100 kilobytes of data or more. The data corresponding to the transaction may include information about the types and quantities of goods and services in the transaction, information about the account holder, the account user, the merchant, tax and incentive treatment(s) of the goods and services, coupons, rebates, rewards, loyalty, discounts, returns, exchanges, cash-back transactions, etc.

Transaction handler may store information about transactions processed through payment processing system in data warehouses such as may be incorporated as part of the plurality of networks/switches. This information may be data mined. The data mining transaction research and modeling can be used for advertising, account holder and merchant loyalty incentives and rewards, fraud detection and prediction, and to develop tools to demonstrate savings and efficiencies made possible by use of the payment processing system over paying and being paid by cash, or other traditional payment mechanisms.

The PR Platform, via the network, may facilitate real time alerts that may be generated from POS transactional data and prior registrations of account holders with the PR Platform. These 'e-alerts' may provide both consumer safety and limitations on products liability of manufacturers, and suppliers such as distributors and wholesalers, and retailers by providing real time warnings. Each such warning may include information about defective and dangerous products that have been purchased by a consumer, and the warning or e-alert may be electronically delivered to a logical address of the consumer or the issuer of an account of the consumer, such as via a cellular telephone or a mobile web enable computing device.

PR Platform

FIG. 1 shows a diagram illustrating an example consumer product recall in some embodiments of the PR Platform. For example, a user no may purchase a product 120 from a store 125. The user may make a payment 115 using a payment device such as a debit card, a credit card, a check, mobile phone, cash, and/or the like. The store 125 may be an online store accessible over a communication network 130, or may be a physical retailer. The purchased item 120 may then be delivered to the user no or the user no may pick it up from the retail store. The manufacturer of the product 120 may discover a fault with the product, and may issue a consumer recall, requesting consumers who purchased the product to return it to the manufacturer. The PR Platform may in such situations facilitate an expedient, timely and targeted recall of the product.

FIGS. 2A and 2B show block diagrams illustrating recall issuance procedures in some embodiments of the PR Platform. In one implementation, as shown in FIG. 2A, the manufacturer 210a may at 220a identify one or more safety issues with a product sold to consumers. The manufacturer may then notify the Consumer Product Safety Commission (CPSC) of the safety issue(s) at 225a. More than 15,000 consumer products sold in the United States are under the jurisdiction of the CPSC. The CPSC is responsible for protecting consumers from unreasonable risks of injury and death associated with consumer products. Recall in jurisdictions other than the United States may involve organizations or entities other than the CPSC. For example, recalls in the European Union may be overseen by Consumer Affairs.

The CPSC may undertake an evaluation of the product's level of risk and defect at 230a. This process may take up to several weeks. The CPSC may notify the manufacturer of conclusion from the evaluation of the product at 240a. However, the manufacturer may not necessarily agree with the CPSC's conclusion. The manufacturer may then implement a recall from consumers 205a at 235a based on the CPSC's conclusion.

In an alternate implementation, as shown in FIG. 2B, the manufacturer 210b may identify one or more safety issues with a product sold at 225b, and instead of relying on the CPSC's evaluation, the manufacturer may implement a voluntary recall at after notifying the CPSC 215b at 230b of the safety issue(s). This fast track process may speed up the process and give the manufacturer more control over what and how information is presented to the consumers. The manufacturer may devise and present an action plan to the CPSC at 240b. The action plan may be approved, denied or revised by the CPSC at 245b. Using the action plan, the manufacturer may implement the voluntary recall from consumers 205b at 250b. The manufacturer may also notify State and local health officials as necessary or required.

FIG. 3 shows a diagram illustrating types of products recalled in some embodiments of the PR Platform. Example consumer products recalled fall into categories such as children's items, computer and electronics, sports, outdoors, and recreation, vehicles, tractors and motorsports, hardware, tools and building supply, home and garden, other items such as books, clothing, etc., and/or the like. These items may fall under the CPSC's jurisdiction. Other items such as food, drugs, cosmetics, motor vehicles, vehicle equipment, car seats, boats, environment products (e.g., pesticides), etc., are usually not under CPSC's jurisdiction, but their recall may be facilitated by the PR Platform.

Recent trends and statistics indicate that product recalls are on the rise, with the average number of product recalls increasing by 28 per year. In addition, each instance of a product recall may involve a few hundred to millions of product units. Particularly in some product categories such as children's products (e.g., children's jewelry and toys), any safety issue may require immediate consumer notification and consumer action. In such situations, the PR Platform may facilitate consumers by providing immediate targeted notification, and the manufacturer or supplier by assisting in a responsible and effective recall.

FIG. 4 shows a data flow diagram illustrating an example recall in some embodiments of the PR Platform. In one implementation, a merchant 415 may conduct a sale transaction at the POS terminal 425 by scanning or entering at 445 product barcodes 430. In another implementation, a sale transaction may be made online. The merchant may then send all or a portion of the transaction information to the PR Platform at 450. In one embodiment, the transaction information may include product information (e.g., identifiers such as Product ID, Stock Keeping Unit (SKU) code, Universal Product Code (UPC) code, Price Look Up (PLU) code, a supplier's serial number, a supplier's batch/lot identifier, date and location of manufacture, model number and/or the like), billing address, shipping address, payment information, transaction ID (TID) associated with the payment transaction, and/or the like. In another implementation, an accountholder or buyer 405 may purchase a product, and may capture the product information 430 by a scan or data entry 440 using a computer, a mobile device 435, etc. The product information, along with any other transaction information may be sent to the PR Platform directly by the account holder at 450.

The manufacturer 410 who wishes to recall one or more products may send recall notice 455 to the PR Platform. The recall notice may include information such as, but not limited to: product ID, SKU code, UPC code, serial number, batch/lot identifier, date and location of manufacture, model number, and/or the like. The recall notice may also include a recall message to the consumer Such recall message may inform the consumer about reasons for recall, where to find more information about the recall, contact information, procedure for returning the recalled items, and/or the like. The PR Platform may then forward notification information 460 to the issuer 420, which may send recall message 465 to account holder. The notification information may include product information, recall message, account holder information, and/or the like. Similarly, the recall notification may include product information, recall message and/or the like.

FIG. 5 shows a data flow diagram illustrating example recall party enrollment in some embodiments of the PR Platform. As discussed in FIG. 4, in one embodiment, implementing a product recall may involve parties including a merchant 515, an acquirer 525, an issuer 520 and a manufacturer 510. One or more of the parties may register to access the facilities provided by the PR Platform 501 via web-based registration 535 over a communication network 545. In some implementations, the registration may involve providing identifying information, agreeing to the terms and conditions, paying a nominal fee, and/or the like.

In one implementation, consumers or account holders 505 may also register to participate in the recall facilities provided by the PR Platform. Consumers may utilize web-based registration 540 using a client device 530 to provide identifying information, notification preferences, user name, password, accept terms and conditions, pay a nominal fee, and/or the like. Consumers may also download and install an application module, which upon the first instance of execution, may request identifying information, user name, password, preferences, and/or the like. The requested information may be sent to the PR Platform server. The PR Platform may receive registration data from the merchant, acquirer, issuer, manufacturer and/or consumer and in response, create corresponding records in one or more tables or databases.

FIG. 6 shows a data flow diagram illustrating example Transaction ID (TID) based recall notification component in some embodiments of the PR Platform. In one embodiment, a manufacturer or supplier 610 initiates a recall by sending a recall initiation request 630 to the PR Platform 601. The recall initiation request may be in the form of a Secure Hypertext Transfer Protocol ("HTTP(S)") POST message including manufacturer identifying information and recall information in the form of data formatted according to eXtensible Markup Language ("XML"). An example, HTTP(S) POST message including an XML-formatted recall initiation request may take the following form:

```
POST /signup.php HTTP/1.1
Host: http://buybuytrade.com/affliate/recallinit.pyt
Content-Type: Application/XML
Content-Length: 1306
<?xMl, version = "1.0" encoding = "UTF-8"?>
<recallinit_info>
    <manfacturer_ID>Sitaelectronics</manufacturer_ID>
    <timestamp>2011-02-22 15:22:43</timestamp>
    <login_details>
        <username>genmanager</username>
        <password>guess123</password>
    </login_details>
    <product_details>
        <product_SKU>9693508</product_SKU>
        <product_model>NP-R2003</product_model>
        <product_name>Sita 200W Stereo Receiver
        </product_name>
        <affectedlot>1345633-15650000</affectedlot>
        <affected geocode>MY, LA, CO</affectedgeocode>
    </product_details>
    <contact_details>
        <importer>Buybuy Trade International Inc</importer>
        <contactid>Buybuy Trade International Inc</contact_id>
        <phone>8003394467</phone>
        <contact_time>8 am to 8 pm<icontact_time>
        <contact_day>Monday to Friday</contact_day>
    <website>www.buybuytrade.com/infoaboutrecallprocess.html
    </website>
    </contact_details>
    <recal1_details>
        <hazard>a wiring problem can cause the stereo receiver to
overheat or break during normal use, damaging the stereo receiver
and posing fire hazards</hazard>
        <incidents>Buybuy Trade International has received 5
reports of fire resulting in property damage</incidents>
        <description>The recall involves ...</description>
        <soldlooation>www.newegg.com[isoldlocation>
        <sold_dates>January 2008 to March 2010</sold_dates>
        <remedy>Consumers should immediately stop using the
stereo receiver and contact Buybuy Trade International Inc. for a free
replacement stereo receiver or a full refund</remedy>
    </recall_details>
    [notification_details>
        <template>buybuytemplate.html</template>
        <confirmation_type>web beacon</confirmation_type>
    </notification_details>
</recallinit_info>
```

As shown above, the XML-formatted recall initiation request from a merchant may include manufacturer and/or supplier information, manufacturer and/or supplier login credentials, product details including SKU/UPC code, model, product name, etc., contact details including manufacturer and/or supplier name, contact phone number, website, contact days/hours, etc., recall details including hazards, incidents, locations where products were sold, time during which products were sold, notification details including template in which recall information will be sent to consumers, type of confirmation requested from consumers, etc., as well as any other information pertinent to the recall of the product.

The recall initiation request 630 may be received by the PR Platform. In one implementation, the PR Platform 601 may create entries in one or more databases and/or tables using all or a portion of information extracted from the recall initiation request. An exemplary query, written substantially in the form of Python/PHP/SQL commands to store recall details in a recall database, is provided below:

```
<?PRP header
('Content-Type: text/plain');
mysgl_connect("123.12.123.123",$DBserver,$password);
// access database server
mysgl_select ("RECALL.SQL"); // select database to append
mysgl_query("INSERT INTO RECALLTABLE (timestamp,
product_SKU, hazard, incidents, description, sold_Location,
sold_dates, remedy)
VALUES (time( ),$product_SKU, $hazard, $incidents,
$description, $sold_location, $sold_dates, $temedy);
// add data to table in database mysglclose("RECALL.SQL");
// close connection to database
```

The PR Platform may extract recalled product information from the HTTP(S) POST message 635. The HTTP(S) POST message including XML-formatted recalled product information may be sent to the acquirer 625. The acquirer may further forward the received recalled product information 640 to a merchant 615. The merchant, upon receiving the recalled product information 640 may determine at 645 if any of the recalled products have been sold to consumers. If the recalled products have been sold to consumers, the merchant may look up transaction ID (TID) associated with the recalled product sale at 650. In one implementation, a TID or a token is assigned to each transaction during authorization. TID may be produced by hashing cardholder data (e.g., PAN) with a transaction-unique value as well encryption via one or more encryption algorithms. TID may also be produced by any other methods as long as the resulting token is a unique value and the original account holder data (e.g., PAN) cannot be reproduced. The identified TID associated with the recalled product sale may be packaged into an HTTP(S) POST message and may be sent to the acquirer 625 at 655. An exemplary TID message may have the following XML formatting:

```
POST /signup.php HTTP/1.1
Host: http://visa123.com/tid.pyt
Content-Type: Application/XML
Content-Length: 1306
<?XML version = "1.0" encoding = "UTF-8"?>
<recall_responses>
    <product_details>
        <product_SKU>9693508</product_SKU>
        <product_model>NP-R2003</productmodel>
        <product_name>Sita 200W Stereo Receiver
        </product_name>
    </product_details>
    <tid_details>
        <tid_1>
            <tidnum>A3.4567543FT</tid_num>
            <serialnum>NS23324980</serial_num>
            <transaction_date>May 1 2007 to April 30
2009</transaction_date>
            <merchant_geocode>06902, 10112
            </merchant_geocode>
        </tid_1>
        <tid_2>
```

```
            <tid_num>A456V7599FT</tid_num>
            <serial_num>NS23326765</serial_num>
            <transaction_date>August 2007 to May 30
2009</transaction_date>
            <merchant_geocode>06902, 10112, 06511,
10280</merchant_geocode>
        </tid_2>
        ...
    </tid_details>
</recall_responses>
```

The acquirer 625 may forward the TID message from the merchant 615 to the PR Platform 601 at 660. The PR Platform 6*oi* may receive the TID message from the acquirer 625 and utilize the TID information to determine account number(s) associated with the TID for notification at 665. The PR Platform dot may also determine or look up from one or more databases and/or tables any other information related to the consumer associated with the TID. Examples of consumer information may include payment device identifier (e.g., bank card number, credit or debit card number, prepaid card number, bank account number, etc.), buyer ID, mobile device ID, name, address, shipping address, email address, and/or the like. The PR Platform 601 may then package the identified account numbers and/or other consumer information associated with the TID of recalled product purchases, along with the recall information received from the manufacturer 610 in a notification message 670 for delivery to the issuer 620. The issuer 620 may be identified using the consumer information. An example, HTTP(S) POST message including an XML-formatted notification message 670 may take the following form:

```
<notification_info>
    <consumer_info>
        <card_number>5657878756454654</card_number>
        <card_type>Visa</card_type>
        <user_id>Chase_smarinko</user_id>
    </consumer_info>
    <recall_info>
        <product_details>
            <product_SKU>9693508</product_SKU>
            <product_model>NP-R2003</product_model>
            <product_name>Sita 200W Stereo
            Receiver</product_name> <affectedlot>1345633-
            15650000</affectedlot>
            <affected_geocode>NY, LA, CO</affected_geocode>
        </product_details>
        <contact_details>
            <importer>Buybuy Trade International Inc</importer>
            <contact_id>Buybuy Trade International Inc</contactid>
            <phone>8003394467</phone>
            <contact_time>8 am to 8 pm</contact_time>
            <contact_day>Monday to Friday</contact_day>
            <website>www.buybuytrade.com/infoaboutrecallprocess.html
        </website>
        </contact_details>
        <recall_details>
            <hazard>a wiring problem can cause the stereo receiver to
overheat or break during normal use, damaging the stereo receiver and
posing fire hazards</hazards>
            <incidents>Buybuy Trade International has received 5
reports of fire resulting in property damage</incidents>
            <description>The recall involves ...<description>
            <sold_location>www.newegg.com</sold_location>
            <sold_dates>January 2008 to March 213110</sold_dates>
            <remedy>Consumers should immediately stop using the
stereo receiver and contact Buybuy Trade International Inc. for a free
replacement stereo receiver or a full refund</remedy>
        </recall_details>
        <notification details>
            <template>buybuytemplate.html</template>
            <confirmation_type>web beacon</confirmation_type>
        </notification_details>
    </recall_info>
</notification_info>
```

Upon receiving the notification message 670 identifying the account holders and recall information to be sent to the account holders, the issuer 620 may extract one or more pieces of account holder information (e.g., account number, account holder ID, email address, etc.) to look up one or more account holder preferences at 675. Examples of account holder preferences include preferred notification method (e.g., email, telephone call, SMS/MMS, mail, push notification, etc.), reminder settings, and/or the like. The issuer 620 may utilize the account holder preferences to format and send a recall message to associated account holders 605*a-c* at 680.

FIGS. 7A and 7B show logic flow diagrams illustrating example transaction ID (TID) based recall notification component (TRN) in some embodiments of the PR Platform. At 730, a manufacturer 710, who is registered to use the facilities of the PR Platform, may log in to an account in the PR Platform website or may access an application installed on a client device. The manufacturer 710 may upload recall product information (e.g., SKU/UPC code, product ID, etc.), recall message (e.g., instructions for return, refund or replacement, hazards, safety issues, etc.), and any other information pertinent to the recall to the PR Platform at 732. When the manufacturer submits the information at 732, the submitted information is received at the PR Platform 701 at 736. The PR Platform 701 may extract the recall product information (e.g., SKU/UPC, product ID, etc.) by parsing the information received from the manufacturer 710, and may send the extracted information to one or more acquirers 725 at 738. The acquirers 725 may forward the received recalled product information to one or more merchants 715 at 740. Each merchant 715 may receive the recalled product information at 742 and may extract UPC or SKU code for the recalled product. The merchant 715 at 744 may query one or more product, inventory or transaction databases and/or tables using the SKU/UPC code as a key to determine if the products that have been sold match the products being recalled. If at least one match is found at 746, the merchant 715 may look up Tip corresponding to the transaction involving the recalled product at 748. The merchant 715 may look up TID information from one or more tables and/or databases. The identified TID may then be sent to the acquirer 725 at 750. On the other hand, if no match is found between the products sold and the recalled product at 746, the merchant may generate a null TID (e.g., a rim having a predetermined value corresponding to "no match"). Such a null Tip may be sent to the acquirer 725 at 756. The acquirer 725 may in turn forward the received Tin to the PR Platform 701 at 752.

The PR Platform 701 may receive the TID from the acquirer at 754. The PR Platform 701 may then determine if the TID received is a null TID at 758. If the rpm received is a null Tip, the PR Platform 701 may not proceed further. However, if the 1TD received is not a null TID, the PR Platform 701 may query one or more databases and/or tables using the received TID to determine account numbers associated with the TID at 760. In one implementation, consumer information other than or including account numbers may be determined from the query at 760. In some alternate embodiments, an issuer and/or merchant's database may be the source of the search for matches. If the query yields a match at 761, using either the TID, account numbers or other consumer information, associated issuers 720 may be identified at 762. If there are no matches from the query, the process may conclude with an error or no match result 763. An exemplary query written substantially in the form of Python/PHP/SQL commands to identify consumer information is provided below:

```
<?PHP
  header('Content-Type: text/plain');
  mysql_connect("254.93.179.112",$DBserver,$password);
  // access database server
  mysql_select_db("USER.SQL"); //
  select database table to search
  //create query for user data
  $query = "SELECT UID PaymentID FROM
  UserTable WHERE TID LIKE 'V $TID";
  $result = mysql_query($query); // perform the search
  querymysql_close("USER-SQL"); // close database access
```

The PR Platform 701 may send a recall message including consumer information such as account number to the issuer 720 at 764. The issuer 720 may received the recall message and account number at 766 and retrieve consumer contact information associated with the account number and preferences at 768. The issuer 720 may then re-package the recall message according to the consumer preference and forward the recall message using the consumer's preferred notification method (e.g., email recall message, telephonic recall message, recall push notification, SMS/MMS, and/or the like). The account holder 705 may receive the recall message at 772, concluding the notification process at 774.

FIG. 8 shows a data flow diagram illustrating example Product ID based recall notification in some embodiments of the PR Platform. In one embodiment, a manufacturer or supplier 8*io* initiates a recall by sending a recall initiation request 83*o* to the PR Platform 801. The recall initiation request may be substantially similar in format to the recall initiation request discussed with respect to FIG. 6. The recall initiation request 830 may be received by the PR Platform and may be parsed to extract details of the recall.

In one embodiment, a merchant 815 may send product information for all transactions 832 to the PR Platform 801. The product information may include SKU level data, UPC data, product ID, and/or the like. The product information for all transactions may be sent to the PR Platform 801 in real time, or in batches post transaction. This implementation may not need to rely on merchant retention of transaction information or merchant querying of data.

The PR Platform 801 may compare the product information for all transaction 832 and the product information included in the recall initiation request 830. The PR Platform may then query payment processor 802 databases and/or tables to identify account numbers associated with transactions involving recalled products at 834. The identified account numbers associated with transactions involving recalled products 836 may be packaged into an HTTP(S) POST message and sent to an issuer 820 associated with the identified account numbers. At 840, the issuer 820 may identify account holders associated with the identified account numbers. At 842, the issuer 820 may send recall notification to account holders. In one implementation, the notification may be made using the account holder's preferred notification method.

FIGS. 9A and 9B show logic flow diagrams illustrating example Product ID based recall notification component (PRN) in some embodiments of the PR Platform. In one implementation, at 930, a manufacturer 910, who is registered to use the facilities of the PR Platform, may log in to an account in the PR Platform website or may access an application installed on a client device. The manufacturer 910 may upload recall product information (e.g., product SKU, product UPC, product ID, etc.), recall message (e.g., instructions for return, refund or replacement, hazards, safety issues, etc.), and any other information pertinent to the recall to the PR Platform at 932. When the manufacturer submits the information at 932, the submitted information is received at the PR Platform 901 at 936. The PR Platform 901 may extract the recall product information such as the SKU code by parsing the information received from the manufacturer 910.

At 938, a merchant 915, who is registered to use the facilities of the PR Platform, may log in to an account in the PR Platform website or may access an application installed on a client device. The merchant 915 may upload product codes such as SKU code, UPC code, product ID, and/or the like for all transactions at 940. In one implementation, the merchant platform may be configured to automatically transfer SKU codes of sold products to the PR Platform. In another implementation, the merchant may transfer the SKU codes in a batch mode or in real time.

The PR Platform 901 may receive the transacted product SKU/UPC codes at 942 and the recalled product SKU/UPC codes at 936. At 944, the PR Platform 901 may query one or more tables and/or databases to determine if the recalled SKU/UPC product codes match the transacted SKU/UPC product codes. If there is no match at 945, the PR Platform 901 may conclude the process. However, if there is a match at 945, the PR Platform 901 may query one or more tables and/or databases to identify a payment device ID associated with the product SKU code at 946. The PR Platform 9*ot* may also identify an issuer associated with the payment device ID at 948. Using the payment device ID and the issuer information, the PR Platform 901 may create and send a recall message from the manufacturer 910, along with the payment device ID, to the issuer 92*o* at 950.

The issuer 920 may receive the payment device ID and recall message from the PR Platform 901 at 952. The issuer 920 may then look up an accountholder associated with the payment device ID, and may retrieve any notification preferences selected by the account holder at 954. In one implementation, the issuer 920 may format a recall notification message at 956 to include the recall message from the manufacturer 910 and a trackable link. In another implementation, page tags or clear GIFs may include of a small GIF or PNG image may be embedded in the content of an email for tracking purposes to determine if the account holder received the email notification. In yet another implementation, the account holder may be requested to send an acknowledgement of receipt of recall notification (e.g., request a return SMS/MMS, reply email or a read receipt, a delivery confirmation receipt, and/or the like.). The formatted recall notification message may be sent to the account holder at 958. The account holder 905 may receive the message at 960 and may request information about the recall (e.g., by clicking a URL, providing a user identifier or email address, and/or the like). If the message link is activated or a recall information is requested at 964, the issuer 920 may update a tracking database at 966 to indicate that the account holder and/or a device associated therewith has received the recall notification and has visited an information page (e.g., the manufacturer website where information about the recall is provided, FACEBOOK, TWITTER or other social networks, individual or company's TWITTER feed, and/or the like), which may conclude the notification process. On the other hand, if the message link is not activated within a certain time frame at 964, the issuer 920 may send a reminder recall notification message to the account holder 905.

The cost and implications of a recall to a manufacturer may be substantial. In one hand, there are direct costs associated with recall such as administration costs, shipping costs, fixing, replacing and/or disposing costs, communication, public relations and advertisement costs, inventory costs, lost sales of the recalled products, etc. On the other hand, indirect costs of a recall include government fines if a manufacturer fails to notify CPSC, legal expenses for defense or settlement, lost future sales, reputation and brand image impact and costs, stock price impacts, etc. The PR Platform provides a cost effective solution for implementing an effective and targeted product recall, while minimizing impact to the manufacturer and providing an additional source of revenue for acquirers, merchants, and/or issuers.

FIG. 10 shows a data flow diagram illustrating example revenue share in some embodiments of the PR Platform. A manufacturer 1010 may pay the PR Platform 1001 a fee of, for example, $1/recalled unit at 1030. In one implementation, where an issuer, an acquirer and a merchant are involved in the recall notification, the PR Platform 1001 may share a portion 1035 (e.g., $0.35/recalled unit) of the revenue from the manufacturer 1010 with an acquirer 1025, who in turn shares a portion 1040 (e.g., $0.15/recalled unit) it received with merchant 1015. The PR Platform tom may also share a portion of the revenue 1045 (e.g., $0.30/recalled unit) with the issuer 1020.

In another implementation, a merchant and an issuer may be involved, without an acquirer. In such a situation, the PR Platform toot may share a revenue portion 1050 with the merchant 1015 and a revenue portion 1052 with the issuer 1020. The percent distribution of the revenue between the involved parties may be variable and may be determined based on prior agreements between the parties. Although, a single issuer, acquirer and merchant case is illustrated in FIG. 10, multiple issuers, acquirers and merchants may be involved. In such cases, in one implementation, revenues may be distributed according to percent distribution by party type. For example, if 20 acquirers are involved and the acquirer revenue portion is 35%, each acquirer may receive 1.75%. In another implementation, revenue share may be allocated based on volume of TIDs associated with a recall, number of consumers involved in a recall, number of products involved in a recall, and/or the like for each issuer, acquirer and/or merchant involved in the recall.

FIG. 11 shows a logic flow diagram illustrating example user-initiated recall notification component (URN) in some embodiments of the PR Platform. In situations where products are bought with cash, or when a merchant is not a participating merchant or when a user is interested in actively participating in the PR Platform, the user may utilize a product recall application ("PR app"). The PR app may be downloadable to a client device such as a computer, smart phone, portable devices, tablet, and/or the like. At 1130, a user 1105 may instantiate the PR app installed in a client device (e.g., by clicking or tapping on the PR app icon). At 1132, the user 1105 may scan a purchase (e.g., scan a receipt, product barcode, a web form, and/or the like). In one implementation, the PR app may be a web page, where the user would register and create a user account. The user may fill out a web form, type a product code such as SKU/UPC code, enter or select product name, upload a receipt, and/or the like. At 1134, the user 1105 may submit the purchase processing request. The submitted purchase processing request may be sent to the PR Platform 1101 as an H 1P(S) POST message formatted in XML. The purchase processing request including purchase information may be received by the PR Platform 1101 at 1136. An example XML formatted purchase processing request message may take the following form:

```
<processing_request>
    <user_info>
        <UID>SMartin89</UID>
        <password>storeyre</password>
        <deviceid>iphone_AB564FC/deviceid>
    </user_info>
    <product_info>
        <productl>
            <SKU>7884514</SKU>
            <lotnum>3110001 to AU5000</lotnum>
            <geocode>10122 to 10280</geocode>
        </productISKU>
        <product2_SKU>
            <SKU>8264905</SKU>
            <lotnum>AU6001 to AU7200</lotnum>
            <geocode>06511 to 06902</geocode>
        </product2_SKU>
        ...
        <product3_SKU>
        ...
            <SKU> 8265049</SKU>
        </product3_SKU>
    </product_info>
</processing_request>
```

The PR Platform may extract at least the product information and a user identifier at 1138. The PR Platform may query a user table and/or database using the user identifier to find a record corresponding to the user. The user record may be updated to include the extracted product information at 1140. The product information may also be utilized to query a recall table and/or database at 1142. If a pending recall for the purchased product is found at 1144, the PR Platform 1101 may retrieve recall information associated with the recall product at 1146. The PR Platform um may then generate a recall notification message at 1147. If no pending recall exists for the purchased product at 1144, the PR Platform 1101 may generate a notification message indicating no current recall for the purchased product at 1148. The generated recall notification message from 1146 or 1148 may be sent to the user 1105 at 1150. At 1152, the user 1152 may receive the recall notification message indicating recalled or non-recalled status of the purchased products and any other pertinent information.

FIGS. 12A, 12B, 12C and 12D show example application user interfaces in some embodiments of the PR Platform. In one implementation, as shown in FIG. 12A, the PR app may be utilized to capture product information such as product barcode 1210 using a mobile device having a camera. A user may simple instantiate the PR app, point the camera of the mobile device at the barcode 1205 and click on "scan" 1215 to capture the barcode. Multiple products may be scanned one after another. The PR app may process 1205 the captured barcode information to convert into product information that may be easily read and understood by the user. For example, as shown in FIG. 12B, the product information 1230 identifies products by name, model number and SKU code. Information such as an image of the product and other types of product ID may also be displayed. The user may have the option to select "Recall Service" 1216 to instantiate product recall registration facilities or select "Purchase"

Figure 13A:
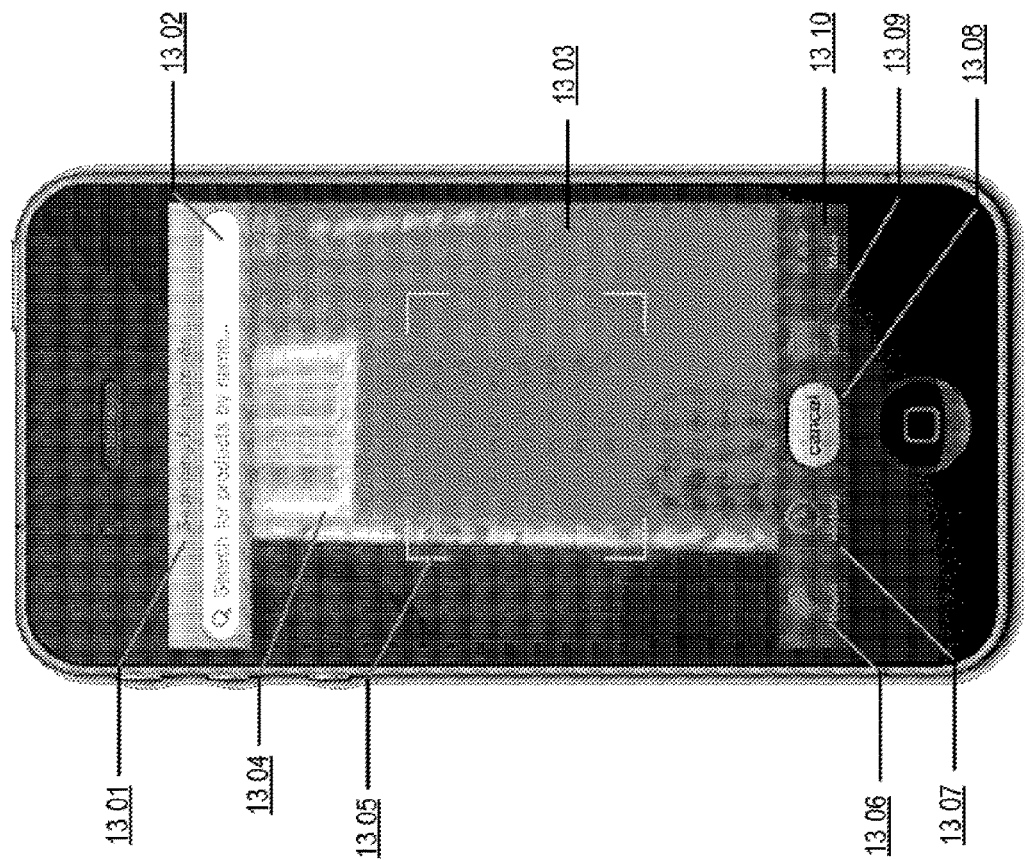
FIGS. 13A, 13B and 13C show example application user interfaces in some embodiments of the PR Platform.
Figure 13C:
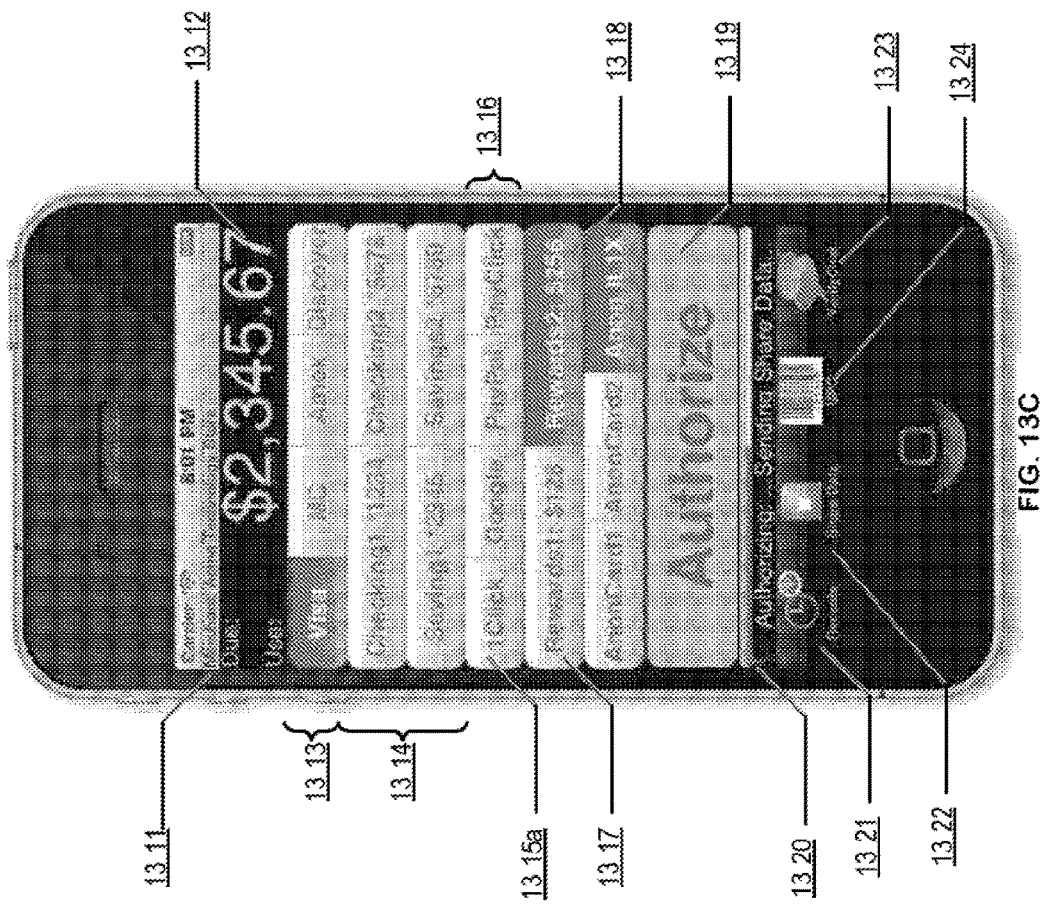
Figure 13B:
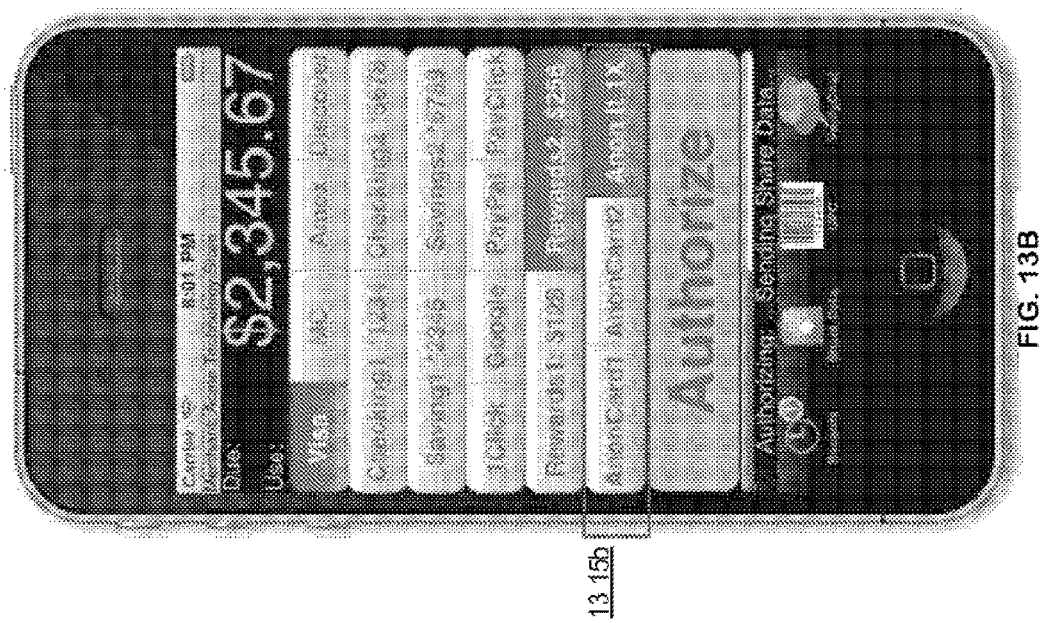

1218 to instantiate single click purchase further discussed with respect to FIGS. 13A, 13B and 13C.

As shown in FIG. 12C, the user may have the option to select or unselect items for recall tracking by checking or unchecking each item. FIG. 12B shows that all three items have been checked as indicated by 1235 for product tracking. Before tapping the "save" 1232 option, the user may add or update "preferences" 1240. The user may also tap on the "back" button to go back to the scan screen of FIG. 12A to scan more items. The user may also tap on "cancel" 1234 to cancel the session.

In one implementation, users may also capture an image of a purchase receipt, upload an e-receipt, search for items by name, model number, SKU/UPC code, and/or the like. In one implementation, a user may desire to scan a purchase receipt from a merchant (e.g., WALMART). The purchase receipt may include, for example, a vacuum cleaner, a baby formula, a carton of eggs, spinach and milk. These products may have different shelf life and warranties. For example, a vacuum cleaner is a long term purchase, usually having a warranty of at least a year, while a baby formula may have a shelf life of, e.g., two years before it expires. Groceries such as eggs, spinach and milk are perishable items that have a very short shelf life of less than a month. As such, not all of the products purchased may need to stored and checked for recall. In one implementation, the PR Platform may apply a pre-selection algorithm that applies one or more pre-selection rules to classify products according to one or more attributes (e.g., product type, shelf life, warranty, etc.) and pre-select items which should be monitored for recall. In a further implementation, the pre-selection algorithm may also determine the length of time during which items may be monitored for recall. For example, when grocery items are extracted from the purchase receipt, the pre-selection algorithm may designate the grocery items for short term recall monitoring (e.g., up to six months). After the completion of the term assigned, the PR Platform may stop monitoring for recall for the grocery items purchased. Similarly, baby formula for example, may be designated for medium term recall monitoring (e.g., up to 2 years), while a vacuum cleaner may be designated for long term monitoring (e.g., duration of the warranty period, up to 15-20 years, etc.).

FIG. 12C shows the "preferences" option that may be available to users. The user may set notification methods 1260 for communicating any recall notification. For example, as shown, a user may have the option of turning on or off email, phone, SMS, MMS, mail and push notification. As shown by 1270, email and push notification have been turned on by the user. The user may save any changes using the "save" button 1265, or may cancel any changes using the "cancel" button 1250. If any of the selected notification method does not have an associated entry (e.g., email is turned on but no email address has been provided), the PR app may automatically request the user to provide and/or verify an email address or turn the notification method off.

FIGS. 13A, 13B and 13C show example application user interfaces in some embodiments of the PR Platform. Specifically, the user interfaces illustrate example features of a one-tap mobile app in some embodiments of the PR Platform. In some implementations, the app may be configured to recognize product identifiers (e.g., barcodes, QR codes, etc.). In some implementations, the user may be required to sign in to the app to enable its features. Once enabled, the camera may provide in-person one tap purchasing features for the user. For example, the client device may have a camera via which the app may acquire images, video data, streaming live video, and/or the like, e.g., 303. The app may be configured to analyze the incoming data, and search, e.g., 301, for a product identifier, e.g., 304. In some implementations, the app may overlay cross-hairs, target box, and/or like alignment reference markers, e.g., 305, so that a user may align the product identifier using the reference markers so facilitate product identifier recognition and interpretation. In some implementations, the app may include interface elements to allow the user to switch back and forth between the product identification mode and the product offer interface display screens (see, e.g., 306), so that a user may accurately study the deals available to the user before capturing a product identifier. In some implementations, the app may provide the user with the ability to view prior product identifier captures (see, e.g., 307) so that the user may be able to better decide which product identifier the user desires to capture. In some implementations, the user may desire to cancel product purchasing; the app may provide the user with a user interface element (e.g., 308) to cancel the product identifier recognition procedure and return to the prior interface screen the user was utilizing. In some implementations, the user may be provided with information about products, user settings, merchants, offers, etc. in list form (see, e.g., 309) so that the user may better understand the user's purchasing options. Various other features may be provided for in the app (see, e.g., 310).

In some implementations, the app executing on the client device of the user may include an app interface providing various features for the user. In some implementations, the app may include an indication of the location (e.g., name of the merchant store, geographical location, information about the aisle within the merchant store, etc.) of the user, e.g., 311. The app may provide an indication of a pay amount due for the purchase of the product, e.g., 312. In some implementations, the app may provide various options for the user to pay the amount for purchasing the product(s). For example, the app may utilize the GPS coordinates to determine the merchant store within the user is present, and direct the user to a website of the merchant. In some implementations, the PR Platform may provide an API for participating merchants directly to facilitate transaction processing. In some implementations, a merchant-branded PR Platform application is developed with the PR Platform functionality, which may directly connect the user into the merchant's transaction processing system. For example, the user may choose from a number of payment devices (e.g., credit cards, debit cards, prepaid cards, etc.) from various payment device providers, e.g., 313. In some implementations, the app may provide the user the option to pay the purchase amount using funds included in a bank account of the user, e.g., a checking, savings, money market, current account, etc., e.g., 314. In some implementations, the user may have set default options for which card, bank account, etc. to use for the purchase transactions via the app. In some implementations, such setting of default options may allow the user to initiate the purchase transaction via a single click, tap, swipe, and/or other remedial user input action, e.g., 315. In some implementations, when the user utilizes such an option, the app may utilize the default settings of the user to initiate the purchase transaction. In some implementations, the app may allow the user to utilize other accounts (e.g., Google" Checkout, Paypal" account, etc.) to pay for the purchase transaction, e.g., 316. In some implementations, the app may allow the user to utilize rewards points, airline miles, hotel points, electronic coupons, printed coupons (e.g., by capturing the printed coupons similar to the product identifier) etc., to pay for the purchase transaction, e.g., 317-318. In some implementations, the app may provide an option to provide express authorization before initiating the purchase transaction, e.g., 319. In some implementations, the app may provide progress indicator provide indication on the progress of the transaction after the user has selected an option to initiate the purchase transaction, e.g., 320. In some implementations, the app may provide the user with historical information on the user's prior purchases via the app, e.g., 321. In some implementations, the app may provide the user with an option to share information about the purchase (e.g., via email, SMS, wall posting on Facebook®, tweet on Twitteem, etc.) with other users, e.g., 322. In some implementations the app may provide the user an option to display the product identification information captured by the client device (e.g., in order to show a customer service representative at the exit of a store the product information), e.g., 324. In some implementations, the user, app, client device and or PR Platform may encounter an error in the processing. In such scenarios, the user may be able to chat with a customer service representative (e.g., VerifyChat 323) to resolve the difficulties in the purchase transaction procedure.

FIGS. 14A and 14B show an example purchase registration recall notification user interfaces in some embodiments of the PR Platform. In one implementation, product recall tracking and notification facilities provided by the PR Platform may be integrated with online checkout processes. Such an integration may accomplish enrollment and product submission in a single action (e.g., a single click, or tap), simplifying the recall tracking and notification process for the user, merchant, acquirers, issuers and/or PR Platform.

As shown in FIG. 14A, a user may visit an online merchant (e.g., buybirdbuy.com), where the user has placed a product 1320 with a model number 1425 and SKU code 1430 in the cart 1405. The user has selected shipping option, has entered quantity and the total price of $39.00 is shown. The user has provided billing information 1440 and payment information 1445 to purchase the product in the cart 1405. A summary of the purchase including product total, shipping, tax and amount to be charged to the user's VISA card is displayed at 1450. In a situation such as this, the user may normally review that the displayed information is correct and may "place order" by clicking button 1415 or 1455. With the product tracking and recall facilities, the user may have the option of checking box 1435 to register purchase for recall notification. When this option is selected, at least the product information and user contact information may be delivered to the PR Platform (e.g., as an HTTP(S) POST message formatted in XML), without requiring the user to enter information separately or provide additional information. The PR Platform may monitor recalls and notify the user immediately if an item purchased by the user is recalled.

As shown in FIG. 14B, an alternate implementation is shown wherein a user has placed an order and a purchase summary 1460 is displayed. The purchase summary page may display information such as billing address 1475, shipping address, Amounts charged 1480 as well as product information 1470. In addition to the summary information being displayed, a link or a button 1465 may be placed on the purchase summary page. By clicking on the "save for recall notification," at least the product information and user contact address may be captured and sent to the PR Platform, which may monitor recalls and contact the user if an item purchased by the user is recalled.

In one implementation where a user may purchase an item for another item (e.g., by the user identifying the purchase as a gift, using a shipping address different from the shipping address on record or billing address, having a gift message, requesting the user to confirm that the purchase is a gift item, etc.). The PR Platform may capture the shipping information or the user provided gift recipient's information to notify the gift recipient should there be a recall for the purchased item.

FIGS. 15A, 15B and 15C show data flow diagrams illustrating an example procedure to execute a card-based transaction resulting in raw card-based transaction data in some embodiments of the PR Platform. In some implementations, a user, e.g., 1501, may desire to purchase a product, service, offering, and/or the like ("product"), from a merchant. The user may communicate with a merchant server, e.g., 1503, via a client such as, but not limited to: a personal computer, mobile device, television, point-of-sale terminal, kiosk, ATM, and/or the like (e.g., 1502). For example, the user may provide user input, e.g., purchase input 1511, into the client indicating the user's desire to purchase the product. In various implementations, the user input may include, but not be limited to: keyboard entry, card swipe, activating a RFID/NFC enabled hardware device (e.g., electronic card having multiple accounts, smartphone, tablet, etc.), mouse clicks, depressing buttons on a joystick/game console, voice commands, single/multi-touch gestures on a touch-sensitive interface, touching user interface elements on a touch-sensitive display, and/or the like. For example, the user may direct a browser application executing on the client device to a website of the merchant, and may select a product from the website via clicking on a hyperlink presented to the user via the website. As another example, the client may obtain track data from the user's card (e.g., credit card, debit card, prepaid card, charge card, etc.), such as the example track i data provided below:

%B123456789012345'PUBLIC/
J.Q.^990112000000000000901****?* (wherein '1234567890123345' is the card number of 'S.Q. Public' and has a CVV number of 901. '990112' is a service code, and *** represents decimal digits which change randomly each time the card is used.)

In some implementations, the client may generate a purchase order message, e.g., 1512, and provide, e.g., 1513, the generated purchase order message to the merchant server. For example, a browser application executing on the client may provide, on behalf of the user, a (Secure) Hypertext Transfer Protocol ("HTTP(S)") GET message including the product order details for the merchant server in the form of data formatted according to the eXtensible Markup Language ("XML"). Below is an example HTTP(S) GET message including an XML-formatted purchase order message for the merchant server:

```
GET /purchase.php HTTP/1.1
Host: www.merchant.com
Content-Type: Appiication/XML
Content-Length: 1306
<?XML version = "1.0" encoding = "UTF-8"?>
<purchase_order>
    <order_ID>4NFU4RG94</orderID>
    <timestamp>2011-02-22 15:22:43</timestamp>
    <user_ID>john.g.public@gmail.com</userID>
    <client_details>
        <client_IP>192.168.23.126</client_IP>
        üclient_type>smartphone</client_type>
        <client_model>EITC Hero</client_model>
        <OS>Android 2.2</OS>
        <app_installed_flag>true</app_installed_flag>
    </client_details>
    <purchase_details>
        <numproducts>1</numproducts>
        <product>
```

```
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <guantity>I</guantity>
        </product>
    </purchase_details>
    <account_params>
        <account_name>John Q. Public</account_name>
        <account_type>credlt</accounttype>
        <account_num>123456789012345</account_num>
        <billing_address>123 Green St, Norman, OK
            98765</billing_address>
        <phone>123-456-7809</phone>
        <sign>/jqp/</sign>
        <confirm_type>email</confirm_type>
        <contact_Info>john.q.public@gmail.com</contact_info>
    </account_params>
    <shipping_info>
        <shipping_address>same as billingc/shipping_address>
        <ship_type>expedited</ship_type>
        <ship_carrier>FedEx</ship_carrier>
        <ship_account>123-45-678</ship_account>
        <tracking_flag>true</tracking_flag>
        <sign_flag>falser/sign_flag>
    </shipping_info>
</purchase_order>
```

In some implementations, the merchant server may obtain the purchase order message from the client, and may parse the purchase order message to extract details of the purchase order from the user. The merchant server may generate a card query request, e.g., 1514 to determine whether the transaction can be processed. For example, the merchant server may attempt to determine whether the user has sufficient funds to pay for the purchase in a card account provided with the purchase order. The merchant server may provide the generated card query request, e.g., 1515, to an acquirer server, e.g., 1504. For example, the acquirer server may be a server of an acquirer financial institution ("acquirer") maintaining an account of the merchant. For example, the proceeds of transactions processed by the merchant may be deposited into an account maintained by the acquirer. In some implementations, the card query request may include details such as, but not limited to: the costs to the user involved in the transaction, card account details of the user, user billing and/or shipping information, and/or the like. For example, the merchant server may provide a HTTP(S) POST message including an XML-formatted card query request similar to the example listing provided below:

```
POST /oardquery.php HTTP/1.1
Host: www.acquirer.com
Content-Type: Application/XML
Content-Length: 624
<?XML version = "1.0" encoding = "UTF-8"?>
<card_query_request>
    [query_ID>VNEI39FK</query_ID>
    <timestamp>2011-02-22 15:22:44</timestamp>
    <purchase_summary>
        <num_products>1</num_products>
        <product>
            <product_summary>Book XML for
                dummies</product_summary>
            <product_guantity>I<iproduct_quantity?
        </product>
    </purchase_summary>
    <transaction_cost>$34.78</transaction_cost>
    <account_params>
        <acoount_name>John Q. Public</account_name>
        <account_type>credit</account_type>
        <accountnum>123456789012345</account_num>
        <billing_address>123 Green St., Norman, OK
            98765</billing_address>
        <phone>123-456-7809</phone>
        <sign>/jgp/</sign>
    </accountparams>
    <merchant_params>
        <merchant_id>3FBCR4INC</merchant_id>
        <merchant_name>Books & Things, Inc.
        </merchant_name>
        <merchant_auth_key>1NNF484MCP59CHB27365
        </merchant_auth
        _key>
    <imerohant_params>
[/card_guery_reguest>
```

In some implementations, the acquirer server may generate a card authorization request, e.g., 1516, using the obtained card query request, and provide the card authorization request, e.g., 1517, to a pay network server, e.g., 1505. For example, the acquirer server may redirect the HTTP(S) POST message in the example above from the merchant server to the pay network server.

In some implementations, the pay network server may obtain the card authorization request from the acquirer server, and may parse the card authorization request to extract details of the request. Using the extracted fields and field values, the pay network server may generate a query, e.g., 1518, for an issuer server corresponding to the user's card account. For example, the user's card account, the details of which the user may have provided via the client-generated purchase order message, may be linked to an issuer financial institution ("issuer"), such as a banking institution, which issued the card account for the user. An issuer server, e.g., 1506, of the issuer may maintain details of the user's card account. In some implementations, a database, e.g., pay network database 1507, may store details of the issuer servers and card account numbers associated with the issuer servers. For example, the database may be a relational database responsive to Structured Query Language ("SQL") commands. The pay network server may execute a hypertext preprocessor ("PHP") script including SQL commands to query the database for details of the issuer server. An example PHP/SQL command listing, illustrating substantive aspects of querying the database, is provided below:

```
<?PHP
header('Content-Type: text/plain');
mysql_connect("254.93.179.112",$DBserver,Spassword)
// access database server
mysql_select_db("ISSUERS.SQL");
// select database table to search
//create query for issuer server data
$query - "SELECT issuer_name issuer_address
issuer_id ip_address mac_address
auth_key port_num security_settinqs_list
FROM IssuerTable WHERE account_num
LIKE '%' Saccountnum";
$result = mysqlquery($query); // perform the search query
mysql_close("ISSUERS.SQL"); // close database access
?>
```

In response to obtaining the issuer server query, e.g., 1519, the pay network database may provide, e.g., 1520, the requested issuer server data to the pay network server. In some implementations, the pay network server may utilize the issuer server data to generate a forwarding card authorization request, e.g., 1521, to redirect the card authorization request from the acquirer server to the issuer server. The pay network server may provide the card authorization request, e.g., 1522, to the issuer server. In some implementations, the issuer server, e.g., 1506, may parse the card authorization request, and based on the request details may query a database, e.g., user profile database 150S, for data of the user's card account. For example, the issuer server may issue PHP/SQL commands similar to the example provided below:

```
<?PHP
Header('Content-Type: text/plain');
mysql_connect("254.93.179.112",$DBserver,$password);
.// access database server
mysql_select_db("USERS.SQL");
// select database table to search
//create query for user data
$query = "SELECT user_id user_name
user_balance account_type FROM
UserTable
WHERE account_num LIKE '%' $accountnum";
$result = mysql_query($query); // perform the search query
mysql_close("USERS-SQL"); // close database access?)
?>
```

In some implementations, on obtaining the user data, e.g., 1525, the issuer server may determine whether the user can pay for the transaction using funds available in the account, e.g., 1526. For example, the issuer server may determine whether the user has a sufficient balance remaining in the account, sufficient credit associated with the account, and/or the like. If the issuer server determines that the user can pay for the transaction using the funds available in the account, the server may provide an authorization message, e.g., 1527, to the pay network server. For example, the server may provide a HITP(S) POST message similar to the examples above.

In some implementations, the pay network server may obtain the authorization message, and parse the message to extract authorization details. Upon determining that the user possesses sufficient funds for the transaction, the pay network server may generate a transaction data record, e.g., 1529, from the card authorization request it received, and store, e.g., 1530, the details of the transaction and authorization relating to the transaction in a database, e.g., transactions database 151o. For example, the pay network server may issue PHP/SQL commands similar to the example listing below to store the transaction data in a database:

```
<?PHP
header('Content-Type: text/plain');
mysgl_connect("254.92.185.103",$DBserver,$password);
// access database server
mysgl_select("TRANSACTIONS.SQL");
// select database to append
mysgl_query("INSERT INTO PurchasesTable
(timestamp, purchase_summary_list,
num_products, product_summary, product_guantity,
transaction_cost,
account_params_list, account_name, account_type,
account_num, billing_addres,
zipoode, phone, sign, merchant_params_list,
merchant_id, merchant_name,
merchant_auth_key)
VALUES (time( ), $purchase_summary_list,
$num_products, $product_summary,
$product_quantity, $transaction_cost,
```

-continued

```
$account_params_list, $account_name,
$account_type, $account_num, $billing_addres,
$zipcode, $phone, $sign, $merchant_params_list,
$merchant_id, $merchant_name,
$merchant_auth_key)"); //
add data to table in database
mysglclose("TRANSACTIONS.SQL");
// close connection to database
?>
```

In some implementations, the pay network server may forward the authorization message, e.g., 1531, to the acquirer server, which may in turn forward the authorization message, e.g., 1532, to the merchant server. The merchant may obtain the authorization message, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 1533, and store the XML data file, e.g., 1534, in a database, e.g., merchant database 1509. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    [merchant_name>Books & Things, Inc.
    </merchant_name>
    <merchant_auth_key>1NUF484MCP59CHB27365
    </merchant_auth_key>
    [account_number>123456789</account_number>
</merchant_data>
<transaction_data>
    <transaction 1>
        ...
    </transaction 1>
    <transaction 2>
        ...
    </transaction 2>
    .
    .
    .
    [transaction n>
        ...
    </transaction n>
</transaction_data>
```

In some implementations, the server may also generate a purchase receipt, e.g., 1533, and provide the purchase receipt to the client. The client may render and display, e.g., 1536, the purchase receipt for the user. For example, the client may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

With reference to FIG. 15C, in some implementations, the merchant server may initiate clearance of a batch of authorized transactions. For example, the merchant server may generate a batch data request, e.g., 1537, and provide the request, e.g., 1538, to a database, e.g., merchant database 1509. For example, the merchant server may utilize PHP/SQL commands similar to the examples provided above to query a relational database. In response to the batch data request, the database may provide the requested batch data, e.g., 1539. The server may generate a batch clearance request, e.g., 1540, using the batch data obtained from the database, and provide, e.g., 1541, the batch clearance request to an acquirer server, e.g., 1504. For example, the merchant server may provide a HITP(S) POST message including XML-formatted batch data in the message body for the acquirer server. The acquirer server may generate, e.g., 1542, a batch payment request using the obtained batch clearance request, and provide the batch payment request to the pay network server, e.g., 1543. The pay network server may parse the batch payment request, and extract the transaction data for each transaction stored in the batch payment request, e.g., 1544. The pay network server may store the transaction data, e.g., 1545, for each transaction in a database, e.g., transactions database 1510. For each extracted transaction, the pay network server may query, e.g., 1546, a database, e.g., pay network database 1507, for an address of an issuer server. For example, the pay network server may utilize PHP/SQL commands similar to the examples provided above. The pay network server may generate an individual payment request, e.g., 1548, for each transaction for which it has extracted transaction data, and provide the individual payment request, e.g., 1549, to the issuer server, e.g., 1506. For example, the pay network server may provide a HTTP(S) POST request similar to the example below:

```
POST /requestpay.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</tLmestamp>
    <pay_amount>$34.78</pay_amount>
    <account_params>
        <account_name>John Q. Publio</account_name>
        <account_type>credit</account_type>
        <account_num>123456789012345</account_num>
        <billing_address>123 Green St., Norman, OK
        98765</billing_address>
        <phone>123-456-7809</phone>
        [sign>/jqp/</sign>
    </account_params>
    <merchant_params>
        <merchant_id>3FECR4INC</merchant_id>
        <merchant_name>Books & Things, Inc.</merchant_name>
        <merchant_auth_key>1NHF484MCP59CHB27365
        </merchant_auth
        key>
    </merchant_params>
    <purchase_summary>
    <num_products>1</num_products>
    <product>
        <product_summary>Book - XML for
        dummies</product_summary>
        <product_quantity>1</product_quantity?
    </product>
    </purchasesummary>
</pay_reguest>
```

In some implementations, the issuer server may generate a payment command, e.g., 1550. For example, the issuer server may issue a command to deduct funds from the user's account (or add a charge to the user's credit card account). The issuer server may issue a payment command, e.g., 1551, to a database storing the user's account information, e.g., user profile database 1508. The issuer server may provide a funds transfer message, e.g., 1552, to the pay network server, which may forward, e.g., 1553, the funds transfer message to the acquirer server. An example HTTP(S) POST funds transfer message is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CHI4ICRW2</request_ID>
    <clear_flag>true</clear_flag>
    <timestamp>2011-02-22 17:00:02</timestamp>
    <deposit_amount>$34.78</depositamount>
</deposit_ack>
```

In some implementations, the acquirer server may parse the funds transfer message, and correlate the transaction (e.g., using the request ID field in the example above) to the merchant. The acquirer server may then transfer the funds specified in the funds transfer message to an account of the merchant, e.g., 1554.

FIGS. 16A, 16B, 16C and 16D show logic flow diagrams illustrating example aspects of executing a card-based transaction resulting in generation of raw implementations, a user may provide user input, e.g., 1601, into a client indicating the user's desire to purchase a product from a merchant. The client may generate a purchase order message, e.g., 1602, and provide the generated purchase order message to the merchant server. In some implementations, the merchant server may obtain, e.g., 1603, the purchase order message from the client, and may parse the purchase order message to extract details of the purchase order from the user. The merchant server may generate a card query request, e.g., 1604, to determine whether the transaction can be processed. For example, the merchant server may process the transaction only if the user has sufficient funds to pay for the purchase in a card account provided with the purchase order. The merchant server may provide the generated card query request to an acquirer server. The acquirer server may generate a card authorization request, e.g., 1606, using the obtained card query request, and provide the card authorization request to a pay network server. In some implementations, the pay network server may obtain the card authorization request from the acquirer server, and may parse the card authorization request to extract details of the request. Using the extracted fields and field values, the pay network server may generate a query, e.g., 1608, for an issuer server corresponding to the user's card account. In response to obtaining the issuer server query the pay network database may provide, e.g., 1609, the requested issuer server data to the pay network server. In some implementations, the pay network server may utilize the issuer server data to generate a forwarding card authorization request, e.g., 1610, to redirect the card authorization request from the acquirer server to the issuer server. The pay network server may provide the card authorization request to the issuer server. In some implementations, the issuer server may parse, e.g., 1611, the card authorization request, and based on the request details may query a database, e.g., 1612, for data of the user's card account. In response, the database may provide the requested user data. On obtaining the user data, the issuer server may determine whether the user can pay for the transaction using funds available in the account, e.g., 1614. For example, the issuer server may determine whether the user has a sufficient balance remaining in the account, sufficient credit associated with the account, and/or the like, but comparing the data from the database with the transaction cost obtained from the card authorization request. If the issuer server determines that the user can pay for the transaction using the funds available in the account, the server may provide an authorization message, e.g., 1615, to the pay network server.

In some implementations, the pay network server may obtain the authorization message, and parse the message to extract authorization details. Upon determining that the user possesses sufficient funds for the transaction (e.g., 1617, option "Yes"), the pay network server may extract the transaction card from the authorization message and/or card authorization request, e.g., 1618, and generate a transaction data record, e.g., 1619, using the card transaction details. The pay network server may provide the transaction data record for storage, e.g., 1620, to a database. In some implementations, the pay network server may forward the authorization message, e.g., 1621, to the acquirer server, which may in turn forward the authorization message, e.g., 1622, to the merchant server. The merchant may obtain the authorization message, and parse the authorization message to extract its contents, e.g., 1623. The merchant server may determine whether the user possesses sufficient funds in the card account to conduct the transaction. If the merchant server determines that the user possess sufficient funds, e.g., 1624, option "Yes," the merchant server may add the record of the transaction for the user to a batch of transaction data relating to authorized transactions, e.g., 1625. The merchant server may also generate a purchase receipt, e.g., 1627, for the user. If the merchant server determines that the user does not possess sufficient funds, e.g., 1624, option "No," the merchant server may generate an "authorization fail" message, e.g., 1628. The merchant server may provide the purchase receipt or the "authorization fail" message to the client. The client may render and display, e.g., 1629, the purchase receipt for the user.

In some implementations, the merchant server may initiate clearance of a batch of authorized transactions by generating a batch data request, e.g., 1630, and providing the request to a database. In response to the batch data request, the database may provide the requested batch data, e.g., 1631, to the merchant server. The server may generate a batch clearance request, e.g., 1632, using the batch data obtained from the database, and provide the batch clearance request to an acquirer server. The acquirer server may generate, e.g., 1634, a batch payment request using the obtained batch clearance request, and provide the batch payment request to a pay network server. The pay network server may parse, e.g., 1635, the batch payment request, select a transaction stored within the batch data, e.g., 1636, and extract the transaction data for the transaction stored in the batch payment request, e.g., 1637. The pay network server may generate a transaction data record, e.g., 1638, and store the transaction data, e.g., 1639, the transaction in a database. For the extracted transaction, the pay network server may generate an issuer server query, e.g., 1640, for an address of an issuer server maintaining the account of the user requesting the transaction. The pay network server may provide the query to a database. In response, the database may provide the issuer server data requested by the pay network server, e.g., 1641. The pay network server may generate an individual payment request, e.g., 1642, for the transaction for which it has extracted transaction data, and provide the individual payment request to the issuer server using the issuer server data from the database.

In some implementations, the issuer server may obtain the individual payment request, and parse, e.g., 1643, the individual payment request to extract details of the request. Based on the extracted data, the issuer server may generate a payment command, e.g., 1644. For example, the issuer server may issue a command to deduct funds from the user's account (or add a charge to the user's credit card account). The issuer server may issue a payment command, e.g., 1645, to a database storing the user's account information. In response, the database may update a data record corresponding to the user's account to reflect the debit/charge made to the user's account. The issuer server may provide a funds transfer message, e.g., 1646, to the pay network server after the payment command has been executed by the database.

Figure 17:
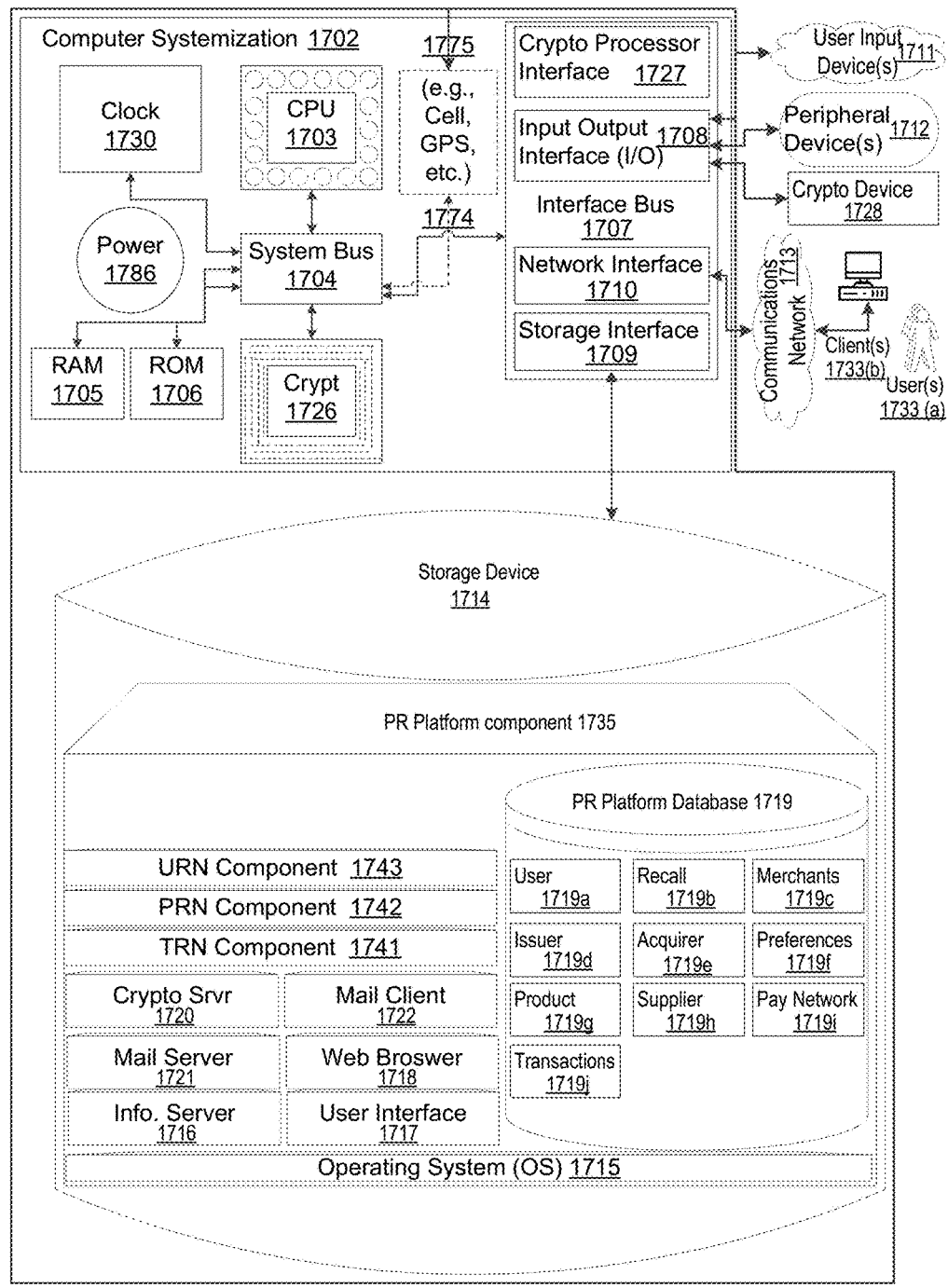
FIG. 17 shows a block diagram illustrating embodiments of a PR Platform controller.

In some implementations, the pay network server may check whether there are additional transactions in the batch that need to be cleared and funded. If there are additional transactions, e.g., 1647, option "Yes," the pay network server may process each transaction according to the procedure described above. The pay network server may generate, e.g., 1648, an aggregated funds transfer message reflecting transfer of all transactions in the batch, and provide, e.g., 1649, the funds transfer message to the acquirer server. The acquirer server may, in response, transfer the funds specified in the funds transfer message to an account of the merchant, e.g., 1650. PR PLATFORM CONTROLLER FIG. 17 shows a block diagram illustrating embodiments of a PR Platform controller. In this embodiment, the PR Platform controller 1701 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 1703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the PR Platform controller 1701 may be connected to and/or communicate with entities such as, but not limited to: one or more users from user input devices 1711; peripheral devices 1712; an optional cryptographic processor device 1728; and/or a communications network 1713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The PR Platform controller 1701 may be based on computer systems that may comprise, but are not limited to, components such as: a computer systemization 1702 connected to memory 1729.

Computer Systemization

A computer systemization 1702 may comprise a clock 1730, central processing unit ("CPU(s)" and/or "processor(s)" (these terms are used interchangeable throughout the disclosure unless noted to the contrary)) 1703, a memory 1729 (e.g., a read only memory (ROM) 1706, a random access memory (RAM) 1705, etc.), and/or an interface bus 1707, and most frequently, although not necessarily, are all interconnected and/or communicating through a system bus 1704 on one or more (mother)board(s) 1702 having conductive and/or otherwise transportive circuit pathways through which instructions (e.g., binary encoded signals) may travel to effectuate communications, operations, storage, etc. The computer systemization may be connected to a power source 1786; e.g., optionally the power source may be internal. Optionally, a cryptographic processor 1726 and/or transceivers (e.g., ICs) 1774 may be connected to the system bus. In another embodiment, the cryptographic processor and/or transceivers may be connected as either internal and/or external peripheral devices 1712 via the interface bus I/O. In turn, the transceivers may be connected to antenna(s) 1775, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing PR Platform controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Mean, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the PR Platform controller and beyond through various interfaces. Should processing requirements dictate a greater amount speed and/or capacity, distributed processors (e.g., Distributed PR Platform), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the PR Platform may be achieved by implementing a microcontroller such as CAST's R8051XC2 microcontroller; Intel's MCS 51 (i.e., 8051 microcontroller); and/or the like. Also, to implement certain features of the PR Platform, some feature implementations may rely•on embedded components, such as: Application-Specific Integrated Circuit ("ASIC"), Digital Signal Processing ("DSP"), Field Programmable Gate Array ("FPGA"), and/or the like embedded technology. For example, any of the PR Platform component collection (distributed or otherwise) and/or features may be implemented via the microprocessor and/or via embedded components; e.g., via ASIC, coprocessor, DSP, FPGA, and/or the like. Alternately, some implementations of the PR Platform may be implemented with embedded components that are configured and used to achieve a variety of features or signal processing.

Depending on the particular implementation, the embedded components may include software solutions, hardware solutions, and/or some combination of both hardware/software solutions. For example, PR Platform features discussed herein may be achieved through implementing FPGAs, which are a semiconductor devices □ containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the PR Platform features. A hierarchy of programmable interconnects allow logic blocks to be interconnected as needed by the PR Platform system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the PR Platform may be developed on regular FPGAs and then migrated into a fixed version that more resembles ASIC implementations. Alternate or coordinating implementations may migrate PR Platform controller features to a final ASIC instead of or in addition to FPGAs. Depending on the implementation all of the aforementioned embedded components and microprocessors may be considered the "CPU" and/or "processor" for the PR Platform.

Power Source

The power source 1786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1786 is connected to at least one of the interconnected subsequent components of the PR Platform thereby providing an electric current to all subsequent components. In one example, the power source 1786 is connected to the system bus component 1704. In an alternative embodiment, an outside power source 1786 is provided through a connection across the I/O 1708 interface. For example, a USB and/or IEEE 1394 connection carries both data and power across the connection and is therefore a suitable source of power.

Interface Adapters

Interface bus(ses) 1707 may accept, connect, and/or communicate to a number of interface adapters, conventionally although not necessarily in the form of adapter cards, such as but not limited to: input output interfaces (I/O) 1708, storage interfaces 1709, network interfaces 1710, and/or the like. Optionally, cryptographic processor interfaces 1727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1709 may accept, communicate, and/or connect to a number of storage devices such as, but not limited to: storage devices 1714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1710 may accept, communicate, and/or connect to a communications network 1713. Through a communications network 1713, the PR Platform controller is accessible through remote clients 1733*b* (e.g., computers with web browsers) by users 1733*a*. Network interfaces may employ connection protocols such as, but not limited to: direct connect, Ethernet (thick, thin, twisted pair 10/100/1000 Base T, and/or the like), Token Ring, wireless connection such as IEEE 8o2.11a-x, and/or the like. Should processing requirements dictate a greater amount speed and/or capacity, distributed network controllers (e.g., Distributed PR Platform), architectures may similarly be employed to pool, load balance, and/or otherwise increase the communicative bandwidth required by the PR Platform controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1710 may be used to engage with various communications network types 1713. For example, multiple network interfaces may be employed to allow for the communication over broadcast, multicast, and/or unicast networks.

Input Output interfaces (I/O) 1708 may accept, communicate, and/or connect to user input devices 1711, peripheral devices 1712, cryptographic processor devices 1728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1711 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1712 may be connected and/or communicate to I/O and/or other facilities of the like such as network interfaces, storage interfaces, directly to the interface bus, system bus, the CPU, and/or the like. Peripheral devices may be external, internal and/or part of the PR Platform controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the PR Platform controller may be embodied as an embedded, dedicated, and/or monitor-less (i.e., headless) device, wherein access would be provided over a network interface connection.

Cryptographic units such as, but not limited to, microcontrollers, processors 1726, interfaces 1727, and/or devices 1728 may be attached, and/or communicate with the PR Platform controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator boo Daughtercard); Via Nano Processor (e.g., L2100, L2200, U2400) line, which is capable of performing 5oo MB/s of cryptographic instructions; VLSI Technology's 33 MHz 6868; and/or the like.

Memory

Generally, any mechanization and/or embodiment allowing a processor to affect the storage and/or retrieval of information is regarded as memory 1729. However, memory is a fungible technology and resource, thus, any number of memory embodiments may be employed in lieu of or in concert with one another. It is to be understood that the PR Platform controller and/or a computer systemization may employ various forms of memory 1729. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1729 will include ROM 1706, RAM 1705, and a storage device 1714. A storage device 1714 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1729 may contain a collection of program and/or database components and/or data such as, but not limited to: operating system component(s) 1715 (operating system); information server component(s) 1716 (information server); user interface component(s) 1717 (user interface); Web browser component(s) 1718 (Web browser); database(s) 1719; mail server component(s) 1721; mail client component(s) 1722; cryptographic server component(s) 1720 (cryptographic server); the PR Platform component(s) 1735; and/or the like (i.e., collectively a component collection). These components may be stored and accessed from the storage devices and/or from storage devices accessible through an interface bus. Although non-conventional program components such as those in the component collection, typically, are stored in a local storage device 1714, they may also be loaded and/or stored in memory such as: peripheral devices, RAM, remote storage facilities through a communications network, ROM, various forms of memory, and/or the like.

Operating System

The operating system component 1715 is an executable program component facilitating the operation of the PR Platform controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the PR Platform controller to communicate with other entities through a communications network 1713. Various communication protocols may be used by the PR Platform controller as a subcarrier transport mechanism for interaction, such as, but not limited to: multicast, TCP/IP, UDP, unicast, and/or the like.

Information Server

An information server component 1716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the PR Platform controller based on the remainder of the HTTP request. For example, a request such as http://123.124.125.126/myInformation.html might have the IP portion of the request "123.124.125.126" resolved by a DNS server to an information server at that IP address; that information server might in turn further parse the hap request for the "/myInformation.html" portion of the request and resolve it to a location in memory containing the information "myinformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the PR Platform database 1719, operating systems, other program components, user interfaces, Web browsers, and/or the like.

Access to the PR Platform database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the PR Platform. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the PR Platform as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

WEB BROWSER

A Web browser component 1718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the PR Platform enabled nodes. The combined application may be nugatory on systems employing standard Web browsers.

Mail Server

A mail server component 1721 is a stored program component that is executed by a CPU 1703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the PR Platform.

Access to the PR Platform mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1722 is a stored program component that is executed by a CPU 1703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1720 is a stored program component that is executed by a CPU 1703, cryptographic processor 1726, cryptographic processor interface 1727, cryptographic processor device 1728, and/or the like. Cryptographic processor interfaces will allow for expedition of encryption and/or decryption requests by the cryptographic component; however, the cryptographic component, alternatively, may rim on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the PR Platform may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the PR Platform component to engage in secure transactions if so desired. The cryptographic component facilitates the secure accessing of resources on the PR Platform and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The PR Platform Database

The PR Platform database component 1719 may be embodied in a database and its stored data. The database is a stored program component, which is executed by the CPU; the stored program component portion configuring the CPU to process the ;tared data. The database may be a conventional, fault tolerant, relational, scalable, secure database such as Oracle or Sybase. Relational databases are an extension of a flat File. Relational databases may include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the PR Platform database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the PR Platform database is implemented as a data-structure, the use of the PR Platform database 1719 may be integrated into another component such as the PR Platform component 1735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1719 includes several tables 1719*a-e*. A User table 1719*a* includes fields such as, but not limited to: a user ID, username, password, device ID, TID, mailing address, email address, telephone number, payment_ID, and/or the like. The user table may support and/or track multiple entity accounts on a PR Platform. A Recall table 1719*b* includes fields such as, but not limited to: recall_ID, product SKU, product_model, product name, importer, contact_id, phone, contact time, contact day, website, hazard, incidents, description, sold_location, sold_dates, remedy, template, confirmation type, and/or the like. A Merchant table 1719*c* includes fields such as, but not limited to: merchant_ID, merchant location, merchant name, TID, product_SKU, product_modelm product name, and/or the like. An Issuer table 1719*d* includes fields such as, but not limited to: issuer ID, issuer name, accountholder ID, product_SKU, TID, issuer address, ip address, mac address, auth key, port num, security settings list and/or the like. An Acquirer table 1719*e* includes fields such as, but not limited to: acquirer ID, acquirer name, acquirer_location, merchant ID, producLSKU, TID, and/or the like. A Preferences table 1719*f* includes fields such as, but not limited to: user ID, notification_ID, reminder settings, and/or the like. A Products table 1719*g* includes fields such as, but not limited to: product ID. product SKU, product UPC, product_model, product name, product_image, product_suppler, product manufacturer, TID, and/or the like. A Supplier table 1719*h* includes fields such as, but not limited to: supplier ID, manufacturer ID, product_ID, product_SKU, address, telephone number, website, email, and/or the like. A Pay Network table 1719*i* may include fields such as, but not limited to: request_id, timestamp, deposit amount, batch_id, TID, clear_flag, deposit account, transaction_summary, payor_name, payor_account, and/or the like. A Transactions table 1719*j* may include fields such as, but not limited to: order id, user_id, timestamp, transaction cost, purchase_details_list, num_products, products list, product_type, product params list, product title, product summary, quantity, user_id, client_id, client_ip, client_type, client_model, operating_system, os_version, app_installed_flag, user_id, account_firstname, account_lastname, account_type, account_num, billingaddress_line1, billingaddress_line2, zipcode, billing_state, shipping_preferences, shippingaddress_line1, shippingaddress_line2, shipping_zipcode, shipping_state, merchant_id, merchant_name, merchant_auth_key, and/or the like.

In one embodiment, the PR Platform database may interact with other database systems. For example, employing a distributed database system, queries and data access by search PR Platform component may treat the combination of the PR Platform database, an integrated data security layer database as a single database entity.

In one embodiment, user programs may contain various user interface primitives, which may serve to update the PR Platform. Also, various accounts may require custom database tables depending upon the environments and the types of clients the PR Platform may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1719*a-h*. The PR Platform may be configured to keep track of various settings, inputs, and parameters via database controllers.

The PR Platform database may communicate to and/or with other components in a component collection, including itself, and/or facilities of the like. Most frequently, the PR Platform database communicates with the PR Platform component, other program components, and/or the like. The database may contain, retain, and provide information regarding other nodes and data.

The PR Platforms

The PR Platform component 1735 is a stored program component that is executed by a CPU. In one embodiment, the PR Platform component incorporates any and/or all combinations of the aspects of the PR Platform that was discussed in the previous figures. As such, the PR Platform affects accessing, obtaining and the provision of information, services, transactions, and/or the like across various communications networks.

The PR Platform transforms recall initiation requests 630, 830, product ID 832 and purchase processing request 1134 inputs via PR Platform components TRN, PRN and URN into recalled product information 635, 640, TID 655, 660, recall notification message 670, 680, account numbers 836 and recall notification 842 outputs.

The PR Platform component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the PR Platform server employs a cryptographic server to encrypt and decrypt communications. The PR Platform component may communicate to and/or with other components in a component collection, including itself, and/or facilities of the like. Most frequently, the PR Platform component communicates with the PR Platform database, operating systems, other program components, and/or the like. The PR Platform may contain, communicate, generate, obtain, and/or provide program component, system, user, and/or data communications, requests, and/or responses.

Distributed PR Platforms

The structure and/or operation of any of the PR Platform node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the PR Platform controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yam, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Valuei is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the PR Platform controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/
accept incoming communication
$sock = socket_create(AF_INET, SOCK _STREAM, 0);
socket_bind($sock, $address, $port) or
die('Could not bind to address');
socket_listen($sock):
$client = socket_accept(*sock);
```

```
// read input data from client device in 1024
byte blocks until end of message
do {
    $input = "";
    $input = socket_read($client, 1024):
    $data .= $input;
} while($input != "");
// parse data to extract variables
$obj = json_decode($data, true);
// store input data in a database
mysql_connect("201.408.185.132",$DBserver,$password);
// access database server
mysql_select("CLIENT_DB.SQL"); // select database to append
mysql_query("INSERT INTO UserTable (transmission))
VALUES ($data)"); // add data to UserTable
table in a CLIENT database
mysqlclose("CLIENTDB.SQL"); // close connection to database
?>
```

Also, the following resources may be used to provide example embodiments regarding SOAP parser implementation:

```
        http://www.xav.com/perl/site/lib/SOAP/Parser.html
        http://publib.boulder.ibm.com/infocenter/
        tivihelp/v2r1/index.jsp?topic=/com.ibm
        .IBMDI.doc/referenceguide295.htm
    and other parser implementations:
        http://publib.boulder.ibm.com/infocenter/
        tivihelp/v2r1/index.]isp?topic=/com.ibm
        .IBMDI.doc/referenceguide259.htm
``` all of which are hereby expressly incorporated by reference.

In order to address various issues and advance the art, the entirety of this application for PRODUCT RECALL PLATFORM APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a PR Platform individual and/or enterprise user, database configuration and/or relational model, data type, data transmission and/or network framework, syntax structure, and/or the like, various embodiments of the PR Platform, may be implemented that enable a great deal of flexibility and customization. For example, aspects of the PR Platform may be adapted for analytics and targeting offers and other loyalty programs. While various embodiments and discussions of the PR Platform have been directed to recall monitoring and notification, however, it is to be understood that the embodiments described herein may be readily configured and/or customized for a wide variety of other applications and/or implementations.

What is claimed is:

1. A processor-implemented product recall method, comprising:
  receiving via a transaction handler a purchase processing request including a plurality of product identifiers, the transaction handler comprising a processor and a memory storing the plurality of transactions in a product recall database, the plurality of product identifiers being associated with a plurality of transactions from a data source of a supplier via a network, wherein the memory stores the plurality of product identifiers in a product recall database;
  preselecting via the transaction handler, by executing a pre-selection algorithm, product identifiers that qualify for purchase processing based on at least one purchase processing rule, said preselecting comprising classifying products according to one of the following attributes: product type, shelf life, and warranty, said preselecting further comprising determining a length of recall monitoring time based on the one of the attributes;
  querying the product recall database to determine if the preselected product identifiers match recalled product identifiers in the product recall database;
  determining by the transaction handler a matching product identifier based on the querying, wherein the matching product identifier is associated with a transaction identifier, said transaction identifier being an electronic token assigned to each transaction during authorization for the one of the plurality of products, said transaction identifier being produced by hashing cardholder data of the account holder with a transaction-unique value or by encryption via one or more encryption algorithms;

when at least one of the presented product identifiers match the recalled product identifiers, retrieving a recall message associated with the at least one of the preselected product identifiers;

retrieving notification preferences associated with the purchase processing request; and generating via the transaction handler a recall notification message to be sent over the network in accordance with the notification preferences and including the recall message associated with the at least one of the preselected product identifiers.

2. The method of claim 1, further comprising extracting the plurality of product identifiers from the purchase processing request before preselecting.

3. The method of claim 1, further comprising: determining a recall monitoring duration for each of the preselected product identifiers; and monitoring recall for each of the preselected product identifiers for the recall monitoring duration.

4. The method of claim 3, wherein the recall monitoring duration is determined based on at least one recall monitoring rule.

5. The method of claim 1, wherein the recall notification message includes manufacturer supplied information for the recalled product identifiers.

6. The method of claim 5, wherein the manufacturer supplied information includes a product identifier, hazard information, incident information, description of recall and instructions for consumers.

7. The method of claim 1, wherein the at least one purchase processing rule include pre-selections based on product type, shelf life, and warranty.

8. The method of claim 1, wherein the purchase processing request includes a plurality of barcode images associated with the plurality of product identifiers or an image of a purchase receipt comprising the plurality of product identifiers.

9. A system comprising:

a memory;

a processor for a transaction handler disposed in communication with said memory, and configured to issue a plurality of processing instructions stored in the memory, wherein the memory stores a plurality of product identifiers in a product recall database, wherein the processor issues instructions to:

receive a purchase processing request including a plurality of product identifiers, the plurality of product identifiers being associated with a plurality of transactions;

preselect product identifiers, based on a pre-selection algorithm, that qualify for purchase processing based on at least one purchase processing rule, said preselect comprising classify products according to one of the following attributes: product type, shelf life, and warranty, said preselect further comprising determine a length of recall monitoring time based on the one of the attributes;

query a product recall database to determine if the preselected product identifiers match recalled product identifiers in the product recall database;

determine a matching product identifier based on the querying, wherein the matching product identifier is associated with a transaction identifier, said transaction identifier being an electronic token assigned to each transaction during authorization for the one of the plurality of products, said transaction identifier being produced by hashing cardholder data of the account holder with a transaction-unique value or by encryption via one or more encryption algorithms;

when at least one of the preselected product identifiers match at least one of recalled product identifiers, retrieve a recall message associated with the at least one of the preselected product identifiers;

retrieve notification preferences associated with the purchase processing request; and generate a recall notification message to be sent over a network in accordance with the notification preferences and including the recall message associated with the at least one of the preselected product identifiers.

10. The system of claim 9, wherein the processor further extracts the plurality of product identifiers from the purchase processing request before preselecting.

11. The system of claim 9, wherein the processor determines a recall monitoring duration for each of the preselected product identifiers; and monitors recall for each of the preselected product identifiers for the recall monitoring duration.

12. The system of claim 11, wherein the recall monitoring duration is determined based on at least one recall monitoring rule.

13. The system of claim 9, wherein the recall notification message includes manufacturer supplied information for the recalled product identifiers.

14. The system of claim 13, wherein the manufacturer supplied information includes a product identifier, hazard information, incident information, description of recall and instructions for consumers.

15. The system of claim 9, wherein the at least one purchase processing rule include pre-selections based on product type, shelf life, and warranty.

16. A non-transitory processor-readable medium storing processor-issuable instructions to:

receiving via a transaction handler a purchase processing request including a plurality of product identifiers, the transaction handler comprising a processor and a memory storing the plurality of transactions in a product recall database, the plurality of product identifiers being associated with a plurality of transactions from a data source of a supplier via a network, wherein the memory stores the plurality of product identifiers in a product recall database;

preselecting via the transaction handler, by executing a pre-selection algorithm, product identifiers that qualify for purchase processing based on at least one purchase processing rule, said pre-selecting comprising classifying products according to one of the following attributes: product type, shelf life, and warranty, said preselecting further comprising determining a length of recall monitoring time based on the one of the attributes;

querying the product recall database to determine if the preselected product identifiers match recalled product identifiers in the product recall database;

determining by the transaction handler a matching product identifier based on the querying, wherein the matching product identifier is associated with a transaction identifier, said transaction identifier being an electronic token assigned to each transaction during authorization for the one of the plurality of products, said transaction identifier being produced by hashing cardholder data of the account holder with a transaction-unique value or by encryption via one or more encryption algorithms;

when at least one of the presented product identifiers match the recalled product identifiers, product identifiers;
retrieving notification preferences associated with the purchase processing request; and
generating via the transaction handler a recall notification message to be sent over the network in accordance with the notification preferences and including the recall message associated with the at least one of the preselected product identifiers.

17. The system of claim 1, further comprising extracting the plurality of product identifiers from the purchase processing request before preselecting.

18. The method of claim 1, further comprising: determining a recall monitoring duration for each of the preselected product identifiers; and monitoring recall for each of the preselected product identifiers for the recall monitoring duration.

19. The method of claim 3, wherein the recall monitoring duration is determined based on at least one recall monitoring rule.

20. The method of claim 1, wherein the at least one purchase processing rule include pre-selections based on product type, shelf life, and warranty.

* * * * *